United States Patent
Minami et al.

(10) Patent No.: US 11,035,019 B2
(45) Date of Patent: *Jun. 15, 2021

(54) HIGH-STRENGTH STEEL SHEET AND PRODUCTION METHOD THEREFOR

(71) Applicant: JFE STEEL CORPORATION, Tokyo (JP)

(72) Inventors: Hidekazu Minami, Tokyo (JP); Shinjiro Kaneko, Tokyo (JP); Takeshi Yokota, Tokyo (JP); Kazuhiro Seto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 811 days.

This patent is subject to a terminal disclaimer.

(21) Appl. No.: 15/547,876

(22) PCT Filed: Jan. 27, 2016

(86) PCT No.: PCT/JP2016/000408
§ 371 (c)(1),
(2) Date: Aug. 1, 2017

(87) PCT Pub. No.: WO2016/125462
PCT Pub. Date: Aug. 11, 2016

(65) Prior Publication Data
US 2018/0016656 A1 Jan. 18, 2018
US 2018/0179610 A9 Jun. 28, 2018

(30) Foreign Application Priority Data
Feb. 3, 2015 (JP) .............. JP2015-019581

(51) Int. Cl.
| | |
|---|---|
| C21D 9/46 | (2006.01) |
| C23C 2/06 | (2006.01) |
| C23C 2/28 | (2006.01) |
| C22C 38/12 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C23C 2/02 | (2006.01) |
| C22C 38/60 | (2006.01) |
| C21D 1/25 | (2006.01) |
| B32B 15/01 | (2006.01) |
| C21D 6/00 | (2006.01) |

(52) U.S. Cl.
CPC .............. *C21D 9/46* (2013.01); *B32B 15/013* (2013.01); *C21D 1/25* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0273* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/60* (2013.01); *C23C 2/02* (2013.01); *C23C 2/06* (2013.01); *C23C 2/28* (2013.01); *C21D 2211/005* (2013.01); *C21D 2211/008* (2013.01)

(58) Field of Classification Search
CPC ...................................................... C21D 9/46
See application file for complete search history.

(56) References Cited

U.S. PATENT DOCUMENTS

| | | | |
|---|---|---|---|
| 8,840,738 B2 | 9/2014 | Murakami et al. | |
| 9,322,091 B2 | 4/2016 | Kimura et al. | |
| 10,385,431 B2* | 8/2019 | Minami | ............... C21D 8/0236 |
| 10,472,697 B2* | 11/2019 | Minami | ................... C21D 9/46 |
| 10,563,279 B2* | 2/2020 | Minami | ............... C21D 8/0221 |
| 2007/0190353 A1* | 8/2007 | Taniguchi | ............. B32B 15/013 |
| | | | 428/659 |
| 2008/0118390 A1 | 5/2008 | Kizu et al. | |
| 2010/0104891 A1 | 4/2010 | Nakagaito et al. | |
| 2012/0012231 A1* | 1/2012 | Murakami | ........... C21D 8/0405 |
| | | | 148/504 |
| 2013/0213529 A1 | 8/2013 | Kimura et al. | |
| 2015/0027594 A1 | 1/2015 | Kawamura et al. | |
| 2016/0186283 A1* | 6/2016 | Minami | ................... C22C 38/04 |
| | | | 428/659 |
| 2016/0186299 A1 | 6/2016 | Minami et al. | |

(Continued)

FOREIGN PATENT DOCUMENTS

| | | |
|---|---|---|
| CN | 102341518 A | 2/2012 |
| CN | 102712979 A | 10/2012 |

(Continued)

OTHER PUBLICATIONS

Apr. 3, 2018, Office Action issued by the State Intellectual Property Office in the corresponding Chinese Patent Application No. 201680008577.4 with English language Search Report.

(Continued)

*Primary Examiner* — Jophy S. Koshy
(74) *Attorney, Agent, or Firm* — Kenja IP Law PC

(57) ABSTRACT

A steel sheet has a microstructure that contains ferrite in an area ratio of 20% or more, martensite in an area ratio of 5% or more, and tempered martensite in an area ratio of 5% or more. The ferrite has a mean grain size of 20.0 μm or less. An inverse intensity ratio of γ-fiber to α-fiber in the ferrite is 1.00 or more and an inverse intensity ratio of γ-fiber to α-fiber in the martensite and the tempered martensite is 1.00 or more.

22 Claims, No Drawings

(56) References Cited

U.S. PATENT DOCUMENTS

| | | | |
|---|---|---|---|
| 2018/0016656 A1 | 1/2018 | Minami et al. | |
| 2018/0023160 A1* | 1/2018 | Minami | C21D 8/0205 |
| | | | 428/659 |
| 2018/0179610 A9 | 6/2018 | Minami et al. | |
| 2019/0100819 A1* | 4/2019 | Minami | C23C 2/02 |
| 2019/0203316 A1* | 7/2019 | Minami | B32B 15/013 |
| 2019/0226067 A1* | 7/2019 | Minami | C21D 8/0205 |
| 2019/0323101 A1* | 10/2019 | Minami | C22C 38/06 |

FOREIGN PATENT DOCUMENTS

| | | | |
|---|---|---|---|
| CN | 104093873 A | 10/2014 | |
| EP | 2415891 A1 | 2/2012 | |
| EP | 2527483 A1 | 11/2012 | |
| EP | 2636762 A1 | 9/2013 | |
| EP | 2738274 A1 | 6/2014 | |
| EP | 2998415 A1 | 3/2016 | |
| JP | 2005120472 A | 5/2005 | |
| JP | 2006183131 A | 7/2006 | |
| JP | 2007092130 A | 4/2007 | |
| JP | 2008240123 A | 10/2008 | |
| JP | 2010255091 A | 11/2010 | |
| JP | 2011168880 A | 9/2011 | |
| WO | 2005095663 A1 | 10/2005 | |
| WO | 2008123267 A1 | 10/2008 | |
| WO | WO-2010114131 A1 * | 10/2010 | C21D 8/0405 |
| WO | 2012060294 A1 | 5/2012 | |
| WO | 2013073136 A1 | 5/2013 | |
| WO | 2015015738 A1 | 2/2015 | |
| WO | 2015015739 A1 | 2/2015 | |
| WO | WO-2015015739 A1 * | 2/2015 | C22C 18/00 |

OTHER PUBLICATIONS

Oct. 23, 2017, Extended European Search Report issued by the European Patent Office in the corresponding European Patent Application No. 16746295.1.

Apr. 26, 2016, International Search Report issued in the International Patent Application No. PCT/JP2016/000408.

Apr. 5, 2019, Communication pursuant to Article 94(3) EPC issued by the European Patent Office in the corresponding European Patent Application No. 167462951.

Oct. 10, 2018, Office Action issued by the Korean Intellectual Property Office in the corresponding Korean Patent Application No. 10-2017-7023456 with English language concise statement of relevance.

Mar. 30, 2020, Office Action issued by the United States Patent and Trademark Office in the U.S. Appl. No. 15/547,100.

* cited by examiner

HIGH-STRENGTH STEEL SHEET AND PRODUCTION METHOD THEREFOR

TECHNICAL FIELD

This disclosure relates to a high-strength steel sheet that is suitable mainly for structural parts of automotive bodies, and a production method therefor. In particular, this disclosure relates to a high-strength steel sheet that has a tensile strength (TS) of 780 MPa or more, that exhibits high rigidity (high Young's modulus), and that is excellent in deep drawability and stretch flangeability.

BACKGROUND

In view of recent global environmental issues, emission regulations have been tightened for automobiles, and reducing the weight of automobile bodies has been a critical issue.

To reduce the weight of automobile bodies, one effective approach is to reduce the thickness of steel sheets by increasing strength (sheet metal thinning). As a result of remarkable advancement of steel sheet strength, there is an increasing trend toward the use of thin steel sheets whose thickness is less than 2.0 mm, yet TS is not lower than 780 MPa. Such sheet metal thinning, however, can be accompanied by a reduction in vehicle body's rigidity, which is considered problematic, and further improvement in the rigidity of structural parts of automobiles is becoming an issue. The rigidity of structural parts is determined by the thickness and Young's modulus of the steel sheet for the same cross-sectional shape. Accordingly, it is effective to increase the Young's modulus of the steel sheet to achieve reduction in both weight and rigidity of structural parts.

The Young's modulus of a steel sheet is largely controlled by its texture, and in the case of iron, which has a body-centered cubic lattice, the Young's modulus is known to be high in the <111> orientation, in which atoms are densely packed, and low in the <100> orientation, in which atoms are less densely packed. It is known that the Young's modulus of ordinary iron having no anisotropy in crystal orientation is about 206 GPa. If anisotropy is given to the crystal orientation to increase the atomic density in a specific direction, it is possible to increase the Young's modulus in that direction. For the rigidity of an automobile body, however, as loads are applied from various directions, it is necessary to set a high Young's modulus not only in a specific direction but also in every possible direction.

On the other hand, increasing the strength of the steel sheet leads to deterioration of formability. It is thus difficult for a steel sheet to have both increased strength and excellent formability. Therefore, it is desirable to develop steel sheets with increased strength and excellent formability.

In response to such a demand, for example, JP2007092130A (PTL 1) proposes "a method for producing a high-strength thin steel sheet with high rigidity, the method comprising: hot rolling a slab to obtain a hot-rolled steel sheet, the slab comprising a chemical composition containing, by mass %, C: 0.02% to 0.15%, Si: 0.3% or less, Mn: 1.0% to 3.5%, P: 0.05% or less, S: 0.01% or less, Al: 1.0% or less, N: 0.01% or less, Ti: 0.1% to 1.0%, and the balance consisting of Fe and incidental impurities; cold rolling the steel sheet at a rolling reduction of 20% to 85%; and subjecting the steel sheet to recrystallization annealing to have a ferrite single-phase microstructure, a TS of 590 MPa or more, a Young's modulus of 230 GPa or more in a direction at 90° with respect to a rolling direction, and a mean Young's modulus of 215 GPa or more in directions of 0°, 45°, and 90° with respect to the rolling direction".

JP2006183131A (PTL 2) proposes "a method for producing a high-rigidity and high-strength steel sheet with good formability, the method comprising: hot rolling a slab to obtain a hot-rolled steel sheet, the slab comprising a chemical composition containing, by mass %, C: 0.02% to 0.15%, Si: 1.5% or less, Mn: 1.5% to 4.0%, P: 0.05% or less, S: 0.01% or less, Al: 1.5% or less, N: 0.01% or less, Nb: 0.02% to 0.40%, and the balance consisting of Fe and incidental impurities; cold rolling the steel sheet at a rolling reduction of 50% or more; and then subjecting the steel sheet to recrystallization annealing to have a mixed microstructure of ferrite and martensite, a TS of 590 MPa or more, and a Young's modulus of 225 GPa or more in a direction orthogonal to a rolling direction".

JP2005120472A (PTL 3) proposes "a method for producing a high-strength steel sheet, comprising: hot rolling a slab to obtain a hot-rolled steel sheet, the slab comprising a chemical composition containing, by mass %, C: 0.010% to 0.050%, Si: 1.0% or less, Mn: 1.0% to 3.0%, P: 0.005% to 0.1%, S: 0.01% or less, Al: 0.005% to 0.5%, N: 0.01% or less, Nb: 0.03% to 0.3%, and the balance consisting of Fe and incidental impurities; then cold rolling the steel sheet; and subjecting the steel sheet to recrystallization annealing to have a steel microstructure with an area ratio of ferrite phase of 50% or more and an area ratio of martensite phase of 1% or more, and to have a Young's modulus of 225 GPa or more in a direction orthogonal to a rolling direction and a mean r value of 1.3 or more".

JP2008240123A (PTL 4) proposes "a method for producing a high-strength thin steel sheet with high rigidity and good hole expansion formability, the method comprising: hot rolling a slab to obtain a hot-rolled steel sheet, the slab comprising a chemical composition containing, by mass %, C: 0.05% to 0.15%, Si: 1.5% or less, Mn: 1.5% to 3.0%, P: 0.05% or less, S: 0.01% or less, Al: 0.5% or less, N: 0.01% or less, Nb: 0.02% to 0.15%, Ti: 0.01% to 0.15%, and the balance consisting of Fe and incidental impurities; cold rolling the steel sheet at a rolling reduction of 40% to 75%; and then subjecting the steel sheet followed by recrystallization annealing to have a microstructure with an area ratio of ferrite phase of 50% or more, and to have a TS of 590 MPa or more, satisfying a relation of TS×hole expanding ratio λ≥23000 MPa·%, and a Young's modulus of 235 GPa or more in a direction perpendicular to a rolling direction".

CITATION LIST

Patent Literature

PTL 1: JP2007092130A
PTL 2: JP2006183131A
PTL 3: JP2005120472A
PTL 4: JP2008240123A

SUMMARY

Technical Problem

However, with reference to the examples described in PTL 1, in order for the technique of PTL 1 to achieve a tensile strength of 780 MPa or more, for example, it is necessary to add some expensive elements, such as 0.4 mass % of V and 0.5 mass % of W. Moreover, expensive elements such as Cr and Mo become more essential in order for this technique to obtain higher strength, causing the problem of an increased alloy cost.

The technique of PTL 2 is effective for increasing the Young's modulus of the steel sheet only in one direction. However, this technique cannot be applied for improving the rigidity of such structural parts of automobiles that require steel sheets with a high Young's modulus in every possible direction.

PTL 3 describes a technique that provides good rigidity and good formability, particularly deep drawability. However, this technique provides a TS as low as about 660 MPa.

PTL 4 describes a technique that provides good rigidity and good formability, particularly hole expansion formability. PTL 4 specifies only the Young's modulus in a direction orthogonal to the rolling direction, and the technique of PTL 4 is thus considered to be effective for increasing the Young's modulus of the steel sheet only in one direction. However, this technique cannot be applied for improving the rigidity of such structural parts of automobiles that require steel sheets with a high Young's modulus in every possible direction.

Furthermore, the techniques of PTLs 1 to 4 do not necessarily consider the provision of good deep drawability or stretch flangeability (hole expansion formability).

It would thus be helpful to provide a high-strength steel sheet that has a tensile strength (TS) of 780 MPa or more and a high Young's modulus and that exhibits excellent formability, particularly deep drawability and stretch flangeability, and a production method therefor.

As used herein, "high Young's modulus" means that the steel sheet has a Young's modulus of 205 GPa or more both in a rolling direction and in a direction of 45° with respect to the rolling direction, and a Young's modulus of 220 GPa or more in a direction orthogonal to the rolling direction. "Excellent deep drawability" means that the steel sheet has a mean r value of ≥1.05. "Excellent stretch flangeability (hole expansion formability)" means that the steel sheet has a maximum hole expansion ratio $\lambda$ of ≥20%.

The high-strength steel sheet disclosed herein is intended to include a high-strength cold-rolled steel sheet, a high-strength coated or plated steel sheet having a coating or plating on a surface thereof, a high-strength galvanized steel sheet having a galvanized coating or plating on a surface thereof. Examples of the galvanized coating or plating include a hot-dip galvanized coating, a galvannealed coating, and the like.

Solution to Problem

We made intensive studies to achieve a high strength steel sheet having a TS of 780 MPa or more and a high Young's modulus and excellent in deep drawability and stretch flangeability, as well as a production method therefor, and as a result made the following discoveries.

Specifically, it was found that it is important to: heat a steel slab that is prepared with a chemical composition containing Nb and V, with appropriately controlled amounts of other alloy elements; and then subjecting the steel slab to hot rolling. During the hot rolling, coiling is performed at a relatively high coiling temperature (CT). We also revealed that it is important to utilize the precipitation promoting effect of Nb and V added to the steel to cause most of interstitial elements C and N to precipitate as carbides or nitrides, so that the amounts of solute C and solute N can be minimized.

We also discovered that in the cold rolling following the hot rolling, it is important to increase the rolling reduction insofar as possible to develop $\alpha$-fiber (a fiber texture with the <110> axis parallel to the rolling direction) and $\gamma$-fiber (a fiber texture with the <111> axis parallel to the normal direction).

In this way, by providing the steel sheet before subjection to annealing treatment with a microstructure in which solute C and solute N are minimized and in which $\alpha$-fiber and $\gamma$-fiber textures have developed, it is possible to develop $\alpha$-fiber and $\gamma$-fiber textures, particularly $\gamma$-fiber texture, through temperature control during the subsequent annealing, and to improve the Young's modulus in every possible direction. In addition, producing ferrite, martensite, and tempered martensite in at least a certain ratio can guarantee desired strength.

As a result, we discovered that a high-strength steel sheet having a TS of 780 MPa or more and a high Young's modulus and excellent in deep drawability and stretch flangeability can be produced.

The present disclosure was completed based on these discoveries.

Specifically, the primary features of this disclosure are as described below.

1. A high-strength steel sheet comprising: a chemical composition that contains (consists of), by mass %, C: 0.060% or more and 0.200% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, Nb: 0.001% or more and 0.200% or less, V: 0.001% or more and 0.200% or less, and the balance consisting of Fe and incidental impurities, the chemical composition satisfying a relation of 500≥C*≥1300, where C* is determined by formula (1) given below; and a microstructure that contains ferrite in an area ratio of 20% or more, martensite in an area ratio of 5% or more, and tempered martensite in an area ratio of 5% or more, the ferrite having a mean grain size of 20.0 μm or less, and an inverse intensity ratio of $\gamma$-fiber to $\alpha$-fiber in the ferrite being 1.00 or more and an inverse intensity ratio of $\gamma$-fiber to $\alpha$-fiber in the martensite and the tempered martensite being 1.00 or more:

$$C^* = (12.0/92.9) \times Nb - (12.0/50.9) \times V) \times 10000 \quad (1),$$

where each of the element symbols C, Nb, and V indicates content by mass % of the corresponding element in the steel sheet, and the unit of C* is mass ppm.

2. The high-strength steel sheet according to 1, wherein the chemical composition further contains, by mass %, at least one selected from the group consisting of Cr: 0.05% or more and 1.00% or less, Mo: 0.05% or more and 1.00% or less, Ni: 0.05% or more and 1.00% or less, and Cu: 0.05% or more and 1.00% or less.

3. The high-strength steel sheet according to 1 or 2, wherein the chemical composition further contains, by mass %, B: 0.0003% or more and 0.0050% or less.

4. The high-strength steel sheet according to any one of 1 to 3, wherein the chemical composition further contains, by mass %, at least one selected from the group consisting of Ca: 0.0010% or more and 0.0050% or less, Mg: 0.0005% or more and 0.0100% or less, and REM: 0.0003% or more and 0.0050% or less.

5. The high-strength steel sheet according to any one of 1 to 4, wherein the chemical composition further contains, by mass %, at least one selected from the group consisting of Sn: 0.0020% or more and 0.2000% or less and Sb: 0.0020% or more and 0.2000% or less.

6. The high-strength steel sheet according to any one of 1 to 5, wherein the chemical composition further contains, by mass %, Ta: 0.0010% or more and 0.1000% or less, and the chemical composition containing Ta satisfies a relation of 500≥C*≥1300, where C* is determined by formula (2) given below:

$$C^* = (C - (12.0/92.9) \times Nb - (12.0/50.9) \times V - (12.0/180.9) \times Ta) \times 10000 \qquad (2),$$

where each of the element symbols C, Nb, V, and Ta indicates content by mass % of the corresponding element in the steel sheet, and the unit of C* is mass ppm.

7. The high-strength steel sheet according to any one of 1 to 6, wherein the high-strength steel sheet is a cold-rolled steel sheet.

8. The high-strength steel sheet according to any one of 1 to 6, wherein the high-strength steel sheet comprises a coating or plating on a surface thereof.

9. The high-strength steel sheet according to 8, wherein the coating or plating is a galvanized coating or plating.

10. A method for producing the high-strength steel sheet according to any one of 1 to 6, the method comprising: heating a steel slab comprising the chemical composition as recited in any one of 1 to 6 to a temperature range of 1150° C. to 1300° C.; subjecting the steel slab to hot rolling with a finisher delivery temperature from 850° C. to 1000° C. to obtain a hot-rolled steel sheet; subjecting the hot-rolled steel sheet to coiling in a temperature range of 500° C. to 800° C.; subjecting the hot-rolled steel sheet to cold rolling at a cold rolling reduction of 40% or more to obtain a cold-rolled steel sheet; subjecting the cold-rolled steel sheet to first heat treatment, whereby the cold-rolled steel sheet is heated to a temperature range of 450° C. to 750° C. and retained for 300 s or more in the temperature range of 450° C. to 750° C.; then subjecting the cold-rolled steel sheet to second heat treatment, whereby the cold-rolled steel sheet is heated to a temperature of 750° C. or higher and 950° C. or lower, and subsequently cooled to a cooling stop temperature of 50° C. or higher and 250° C. or lower with a mean cooling rate of 10° C./s or higher at least in a temperature range down to 500° C.; and then subjecting the cold-rolled steel sheet to third heat treatment, whereby the cold-rolled steel sheet is heated to a temperature range of above 250° C. to 600° C. and retained for 10 s or more in the temperature range of above 250° C. to 600° C.

11. The method according to 10, further comprising: after the third heat treatment, subjecting the cold-rolled steel sheet to coating or plating treatment.

12. The method according to 11, wherein the coating or plating treatment is hot-dip galvanizing treatment.

13. The method according to 11, wherein the coating or plating treatment is hot-dip galvanizing treatment to form a hot-dip galvanized coating, and the method further comprises after the hot-dip galvanizing treatment, performing alloying treatment on the hot-dip galvanized coating in a temperature range of 470° C. to 600° C.

Advantageous Effect

According to the disclosure, it is possible to obtain with high productivity a high-strength steel sheet having a TS of 780 MPa or more and a high Young's modulus and excellent in deep drawability and stretch flangeability. High-strength steel sheets disclosed herein are highly beneficial in industrial terms because they can improve fuel efficiency, for example, through a reduction in the weight of automotive bodies when applied to automobile structural parts.

DETAILED DESCRIPTION

The following describes the present disclosure in detail.

In production of a high-strength steel sheet disclosed herein, a steel slab that is prepared with a chemical composition containing Nb and V, with appropriately controlled amounts of other alloy elements, is heated, and then subjected to hot rolling. During the hot rolling, coiling is performed at a relatively high coiling temperature (CT). It is important to utilize this precipitation promoting effect of Nb and V added to the steel to cause most of interstitial elements C and N to precipitate as carbides or nitrides, so that the amounts of solute C and solute N can be minimized.

In cold rolling following the hot rolling, it is important to increase the rolling reduction insofar as possible to develop α-fiber (a fiber texture with the <110> axis parallel to the rolling direction) and γ-fiber (a fiber texture with the <111> axis parallel to the normal direction).

The steel sheet before subjection to annealing treatment thus obtained has a microstructure with solute C and solute N being minimized and α-fiber and γ-fiber textures having developed. In the subsequent annealing, the annealing temperature is controlled so that α-fiber and γ-fiber textures, particularly γ-fiber texture, are caused to develop, the Young's modulus is improved in every possible direction, and ferrite, martensite, and tempered martensite are produced in at least a certain ratio. In this way, the resulting steel sheet may have desired strength.

As a result, it is possible to produce a high-strength steel sheet having a TS of 780 MPa or more and a high Young's modulus, and excellent in deep drawability and stretch flangeability.

The following provides details of high-strength steel sheets as well as production methods therefor disclosed herein; specifically, in the order of chemical compositions, microstructures, and production methods.

First, chemical compositions are described. The "%" representations below indicating the chemical composition of the steel are in "mass %" unless stated otherwise.

[C: 0.060% or More and 0.200% or Less]

C contributes to increasing the Young's modulus by forming precipitates with Nb and V to control grain growth during hot rolling and annealing. C is an element necessary for adjusting the area ratio and the hardness of martensite and tempered martensite when using them for microstructure strengthening.

If the C content is less than 0.060%, ferrite grain size coarsens, it becomes difficult to obtain martensite and tempered martensite in required area ratios, and martensite does not harden. Therefore, sufficient strength cannot be obtained. On the other hand, If the C content exceeds 0.200%, it is necessary to increase the amount of Nb and V to be added accordingly. This causes, however, saturation of the precipitation effect of carbides and an increase in alloy cost. Therefore, the C content is set to 0.060% or more and 0.200% or less. The C content is preferably 0.080% or more. The C content is preferably 0.130% or less.

[Si: 0.50% or More and 2.20% or Less]

Si is an important element in the disclosure. Si is a ferrite stabilizing element that has high solid solution strengthening ability in ferrite, increases the strength of ferrite itself, improves strain hardenability, and increases the ductility of ferrite itself. When austenite forms during annealing, Si purifies ferrite by facilitating solute C diffusion from ferrite to austenite. This makes it possible to maintain ferrite with a favorable texture for ensuring rigidity and deep drawability throughout the annealing process. In addition, upon formation of austenite during annealing, Si stabilizes austenite by concentrating C in austenite and promotes the formation of martensite and low-temperature transformation phases such as bainite. It is thus possible to increase the strength of the steel as required. To obtain this effect, the Si content needs to be 0.50% or more. If the Si content exceeds 2.20%, however, the steel sheet deteriorates in weldability. Such a high Si content also promotes the formation of fire light on a surface of the slab, as well as the occurrence of surface defects, called red scale, in the hot-rolled steel sheet. Furthermore, when the resultant is used as a cold-rolled steel sheet, Si oxides formed on the surface causes deterioration of chemical convertibility. Additionally, in the case of the resultant being used as a hot-dip galvanized steel sheet, Si oxides formed on the surface induces coating or plating failure. Therefore, the Si content is set to 0.50% or more and 2.20% or less. The Si content is preferably 0.80% or more. The Si content is preferably 2.10% or less.

[Mn: 1.00% or More and 3.00% or Less]

Mn increases hardenability in the cooling process during annealing and promotes the formation of martensite and low-temperature transformation phases such as bainite, thereby largely contributing to increasing strength. Mn also serves as a solid solution strengthening element, again contributing to increasing strength. In order to obtain this effect, the Mn content needs to be 1.00% or more. If the Mn content exceeds 3.00%, however, the formation of ferrite, which is necessary for improving rigidity and deep drawability, is remarkably suppressed in the cooling process during annealing. Such a high Mn content also leads to increased martensite and low-temperature transformation phases such as bainite, excessively increasing the strength of the steel and causing the formability to deteriorate. Such a high Mn content also reduces the weldability of the steel sheet. Therefore, the Mn content is set to 1.00% or more and 3.00% or less. The Mn content is preferably 1.50% or more. The Mn content is preferably 2.80% or less.

[P: 0.100% or Less]

P has a solid solution strengthening effect and can be added in accordance with desired strength. P also facilitates transformation to ferrite, and thus is an effective element for forming a multi-phase structure. If the P content exceeds 0.100%, however, spot weldability deteriorates. In the case of performing alloying treatment on a galvanized coating or plating, such a high P content lowers the alloying rate and causes the coating or plating property to deteriorate. Therefore, the P content needs to be 0.100% or less. The P content is preferably 0.001% or more. The P content is preferably 0.100% or less.

[S: 0.0100% or Less]

S becomes a cause of hot cracking during hot rolling, and lowers local deformability when it is present as a sulfide. Thus, the S content needs to be reduced as much as possible. Accordingly, the S content is set to 0.0100% or less. The S content is preferably limited to 0.0050% or less. If the S content should be suppressed below 0.0001%, however, the manufacturing cost increases. Accordingly, a preferred lower limit for the S content is 0.0001%. Therefore, the S content is set to 0.0100% or less. The S content is preferably 0.0001% or more. The S content is preferably 0.0100% or less. The S content is more preferably 0.0001% or more. The S content is more preferably 0.0050% or less.

[Al: 0.010% or More and 2.500% or Less]

Al is a useful element for deoxidizing steel. Therefore, the Al content needs to be 0.010% or more. Further, Al, which is a ferrite-forming element, promotes the formation of ferrite in the cooling process during annealing, stabilizes austenite by concentrating C in austenite, and promotes the formation of martensite and low-temperature transformation phases such as bainite. It is thus possible to increase the strength of the steel as required. To obtain this effect, the Al content is desirably 0.020% or more. An Al content greater than 2.500%, however, significantly raises the $Ar_3$ transformation temperature, eliminates austenite single phase region, and makes it impossible to complete the hot rolling in austenite region. Therefore, the Al content is set to 0.010% or more and 2.500% or less. The Al content is preferably 0.020% or more. The Al content is preferably 2.500% or less.

[N: 0.0100% or Less]

N is an element that deteriorates the anti-aging property of the steel. The deterioration in anti-aging property becomes more pronounced, particularly when the N content exceeds 0.0100%. Accordingly, the N content is set to 0.0100% or less. The N content is preferably limited to 0.0060% or less. Under production constraints, an allowable lower limit for the N content is around 0.0005%.

According to the disclosure, in addition to the above components, the chemical composition needs to further contain Nb: 0.001% or more and 0.200% or less and V: 0.001% or more and 0.200% or less in order to obtain ferrite grown with a favorable orientation for improving the Young's modulus.

[Nb: 0.001% or More and 0.200% or Less]

Nb forms fine precipitates during hot rolling or annealing and causes ferrite to grow with a favorable orientation for improving rigidity and deep drawability during annealing. Nb also suppresses coarsening of recrystallized grains and effectively contributes to improvement of strength. In particular, when Nb content is appropriately set, Nb contributes to the refinement of the austenite phase formed through reverse transformation during annealing, thus to the refinement of the microstructure obtained after annealing and to increased strength. To obtain this effect, the Nb content needs to be 0.001% or more.

If the Nb content exceeds 0.200%, however, carbonitrides cannot be dissolved completely during reheating of an ordinary steel slab, coarse carbonitrides are left, and the effect of increasing strength and suppressing recrystallization cannot be obtained. Even in the case of subjecting a continuously-cast steel slab to hot rolling directly after cooling without reheating, an excess Nb content beyond 0.200% makes only a minor contribution to the recrystallization suppressing effect, but rather, again, ends up increasing alloy cost. Therefore, the Nb content is set to 0.001% or more and 0.200% or less. The Nb content is preferably 0.005% or more. The Nb content is preferably 0.200% or less. The Nb content is more preferably 0.010% or more. The Nb content is more preferably 0.200% or less.

[V: 0.001% or More and 0.200% or Less]

V forms precipitates with C and causes ferrite to grow with a favorable orientation for improving rigidity and deep drawability during annealing. V also suppresses coarsening of recrystallized grains and effectively contributes to improvement of strength. To obtain this effect, the V content needs to be 0.001% or more. If the V content exceeds 0.200%, however, carbonitrides cannot be dissolved completely during reheating of an ordinary steel slab, coarse carbonitrides are left, and the effect of increasing strength and suppressing recrystallization cannot be obtained. Even in the case of subjecting a continuously-cast steel slab to hot rolling directly after cooling without reheating, an excess V content beyond 0.200% makes only a minor contribution to the recrystallization suppressing effect, but rather ends up increasing alloy cost. Therefore, the V content is set to 0.001% or more and 0.200% or less. The V content is preferably 0.005% or more. The V content is preferably 0.200% or less.

Furthermore, the chemical composition of the high-strength steel sheet disclosed herein needs to satisfy a relation of 500≥C*1300, where C* is determined by formula (1) given below using the above contents of C, Nb, and V:

$$C^* = (C - (12.0/92.9) \times Nb - (12.0/50.9) \times V) \times 10000 \quad (1),$$

where each of the element symbols C, Nb, and V indicates the content by mass % of the corresponding element in the steel sheet, and the unit of C* is mass ppm.

Specifically, controlling C*, which represents an excess C content, in a range of 500 mass ppm to 1300 mass ppm makes it possible to cause a development with a favorable orientation for rigidity and deep drawability during cold rolling and annealing. Therefore, C* determined by formula (1) is adjusted to be 500 mass ppm or more and 1300 mass ppm or less. Note that C in the steel forms precipitates with Nb and V, such as NbC and VC. Therefore, an excess C content in the steel can be determined by formula (1) in consideration of such precipitation.

In addition to the above components, the chemical composition disclosed herein may further contain, either alone or in combination, (i) at least one selected from the group consisting of Cr: 0.05% or more and 1.00% or less, Mo: 0.05% or more and 1.00% or less, Ni: 0.05% or more and 1.00% or less, and Cu: 0.05% or more and 1.00% or less, (ii) at least one selected from the group consisting of B: 0.0003% or more and 0.0050% or less, Ca: 0.0010% or more and 0.0050% or less, Mg: 0.0005% or more and 0.0100% or less, and REM: 0.0003% or more and 0.0050% or less, (iii) at least one selected from the group consisting of Sn: 0.0020% or more and 0.2000% or less, and Sb: 0.0020% or more and 0.2000% or less, or (iv) Ta: 0.0010% or more and 0.1000% or less.

Cr, Mo, Ni, and Cu not only serve as solid-solution-strengthening elements, but also act to stabilize austenite in the cooling process during annealing, facilitating formation of a multi-phase structure. To obtain this effect when any of Cr, Mo, Ni, or Cu is added to the steel, the content of each added element needs to be 0.05% or more. If the content of each added element, Cr, Mo, Ni, or Cu, exceeds 1.00%, however, formability and spot weldability deteriorate. Therefore, when any of Cr, Mo, Ni, or Cu is added, the content of each added element is set to 0.05% or more and 1.00% or less.

B suppresses the formation of pearlite and bainite from austenite, stabilizes austenite, and promotes the formation of martensite. B is thus effective for guaranteeing strength. This effect can be obtained when the B content is 0.0003% or more. Excessively adding B beyond 0.0050%, however, does not increase the effect, but rather ends up reducing manufacturability during hot rolling. Therefore, when B is added to the steel, the content is set to 0.0003% or more and 0.0050% or less.

Ca, Mg, and REM are elements that are used for deoxidation, and are effective in causing spheroidization of sulfides and mitigating the adverse effect of sulfides on local ductility. To obtain this effect, the Ca content needs to be 0.0010% or more, the Mg content be 0.0005% or more, and the REM content be 0.0003% or more. However, excessively adding Ca or REM beyond 0.0050% or Mg beyond 0.0100% produces more inclusions, for example, and causes defects such as surface defects and internal defects. Therefore, when added to the steel, the Ca content is set to 0.0010% or more and 0.0050% or less, the Mg content to 0.0005% or more and 0.0100% or less, and the REM content to 0.0003% or more and 0.0050% or less.

Sn and Sb are elements that may be added as necessary from the perspective of suppressing decarbonization, which would result from nitriding and/or oxidation of the steel sheet surface, in a region extending from the surface layer of the steel sheet to a depth of about several tens of micrometers. Suppressing such nitriding and/or oxidation may prevent a reduction in the amount of martensite formed on the steel sheet surface, and may improve fatigue properties and aging resistance. To obtain this effect when any of Sn or Sb is added to the steel, the content of each added element needs to be 0.0020% or more. Excessively adding any of these elements beyond 0.2000% leads to deterioration of toughness. Therefore, when any of Sn or Sb is added, the content of each added element is set to 0.0020% or more and 0.2000% or less.

Ta forms alloy carbides or alloy carbonitrides, and contributes to increasing the strength of the steel, as is the case with Nb and V. It is also believed that Ta has the effect of markedly suppressing coarsening of precipitates when partially dissolved in Nb carbides or Nb carbonitrides to form complex precipitates, such as (Nb, Ta)—(C, N), and providing a stable contribution to increasing the strength of the steel through strengthening by precipitation. Therefore, Ta is preferably added to the steel. The above-described precipitate stabilizing effect can be obtained when the Ta content is 0.0010% or more. Excessively adding Ta, however, fails to increase the precipitate stabilizing effect, but instead results in a rise in alloy cost. Therefore, when Ta is added to the steel, the content is set in a range of 0.0010% to 0.1000%.

When Ta is added, the chemical composition needs to satisfy a relation of 500≥C*≥1300, where C* is determined from formula (2) given below using the above contents of C, Nb, V, and Ta:

$$C^* = (C - (12.0/92.9) \times Nb - (12.0/50.9) \times V - (12.0/180.9) \times Ta) \times 10000 \quad (2),$$

where each of the element symbols C, Nb, V, and Ta indicates content by mass % of the corresponding element in the steel sheet, and the unit of C* is mass ppm.

Specifically, controlling C*, which represents an excess C content, in a range of 500 mass ppm to 1300 mass ppm makes it possible to cause a development with a favorable orientation for increasing rigidity and deep drawability during cold rolling and annealing. Therefore, C* representing an excess C content is set to 500 mass ppm or more and 1300 mass ppm or less. Note that C in the steel forms precipitates with Nb, V, and Ta. Therefore, when Ta is added, an excess C content in the steel can be determined by formula (2) in consideration of such precipitation.

The balance other than the above-described components consists of Fe and incidental impurities. The balance may further contain components other than described above, unless the presence of such components adversely affects the effects of the present disclosure. Oxygen (O), however, generates non-metal inclusions and degrades the quality of the steel sheet. It is thus preferable to suppress the O content to 0.003% or less.

Next, the microstructure of the steel sheet is described.

[Area Ratio of Ferrite: 20% or More]

Ferrite has the effect of causing a texture development favorable for improving rigidity and deep drawability. To obtain this effect, the area ratio of ferrite needs to be 20% or more. To obtain better rigidity and deep drawability, the area ratio of ferrite is preferably 30% or more. As used herein, "ferrite" is intended to include not only so-called ferrite, but also bainitic ferrite, polygonal ferrite, and acicular ferrite, none of which involve precipitation of carbides. Although there is no particular limitation, in view of the fact that it is difficult to guarantee a desired tensile strength TS if the area ratio of ferrite is more than 80%, the area ratio of ferrite is set to 20% or more, and is preferably 30% or more. The area ratio of ferrite is more preferably 30% or more. The area ratio of ferrite is more preferably 80% or less.

[Area Ratio of Martensite: 5% or More]

By including martensite in the microstructure of the steel sheet, the strength and strength-elongation balance are improved. If the area ratio of martensite is less than 5%, it is difficult to guarantee a necessary TS, specifically, a TS of 780 MPa or more. Therefore, the area ratio of martensite needs to be 5% or more. No upper limit is placed on the area ratio of martensite, yet the upper limit is around 60%.

[Area Ratio of Tempered Martensite: 5% or More]

Tempered martensite is a multi-phase of ferrite and cementite with high dislocation density that is obtained by heating martensite to a temperature at or below $Ac_1$, and effectively serves to strengthen the steel. Tempered martensite is also a metallic phase that is less detrimental to hole expansion formability as compared to retained austenite and martensite, and thus is effective for guaranteeing strength without significantly reducing hole expansion formability. Moreover, when tempered martensite coexists with martensite, a reduction in stretch flangeability resulting from martensite is also suppressed. If the area ratio of tempered martensite is less than 5%, the above effect cannot be obtained sufficiently. Although there is no particular limitation, in view of the fact that it is difficult to guarantee a desired tensile strength TS if the area ratio of tempered martensite is more than 60%, the area ratio of tempered martensite is set to 5% or more. The area ratio of tempered martensite is preferably 5% or more. The area ratio of tempered martensite is preferably 60% or less.

The area ratios of ferrite, martensite, and tempered martensite can be determined as described below.

Polish a cross section (L-cross section) of a steel sheet taken in the sheet thickness direction parallel to the rolling direction, etch the cross section with 3 vol. % nital, and observe ten locations at 2000 times magnification under an SEM (scanning electron microscope) at a position of sheet thickness×¼ (a position at a depth of one-fourth of the sheet thickness from the steel sheet surface). From the microstructural images thus obtained, calculate the area ratios of the constituent phases (ferrite, martensite, and tempered martensite) for three fields each using Adobe Photoshop (available from Adobe Systems), and average the results to obtain the area ratios of ferrite, martensite, and tempered martensite, respectively.

In the above microstructural images, identification and area ratio measurement of the constituent phases can be performed since ferrite appears as a gray microstructure (base microstructure), martensite as a white microstructure, and tempered martensite as a microstructure in which fine white carbides precipitate against the gray background.

[Mean Grain Size of Ferrite: 20.0 µm or Less]

If the mean grain size of ferrite is more than 20.0 µm, strength cannot be increased. To improve strength by refining ferrite grains, the mean grain size of ferrite is set to 20.0 µm or less. No lower limit is placed on the mean grain size of ferrite, yet a mean grain size below 1 µm tends to decrease ductility, and hence the mean grain size of ferrite is preferably 1 µm or more. The mean grain size of ferrite was calculated by using Adobe Photoshop as mentioned above to correct the length of a line segment drawn on each microstructural image to its actual length, and divide the actual length by the number of times the line segment drawn on the image intersects grains.

In the microstructure of the high-strength steel sheet disclosed herein, the total area ratio of the above-described ferrite, martensite, and tempered martensite is preferably set to 90% or more.

In addition to the ferrite, martensite, and tempered martensite, the microstructure may further contain other phases well known in the field of steel sheets, such as bainite, tempered bainite, pearlite, and cementite, in an area ratio of 10% or less, without impairing the effects of the present disclosure.

[Inverse Intensity Ratio of γ-Fiber to α-Fiber in Ferrite and Inverse Intensity Ratio of γ-Fiber to α-Fiber in Martensite and Tempered Martensite: Both 1.00 or More]

An α-fiber is a fiber texture in which the <110> axis is parallel to the rolling direction, while a γ-fiber is a fiber texture in which the <111> axis is parallel to the normal direction to the rolled surface. Body-centered cubic metals are characterized in that α-fiber and γ-fiber are caused to develop by rolling deformation so intensely that textures belonging to these fibers can form even in recrystallization.

To increase the rigidity and the Young's modulus of the steel sheet, specifically the Young's modulus and mean r value in every possible direction, it is particularly necessary to cause γ-fiber to develop in ferrite and in martensite and tempered martensite, and to set the inverse intensity ratio of γ-fiber to α-fiber in the ferrite and the inverse intensity ratio of γ-fiber to α-fiber in the martensite and the tempered martensite, at a position of sheet thickness×¼ of the steel sheet, to 1.00 or more.

No upper limit is placed on the inverse intensity ratio of γ-fiber to α-fiber in the ferrite or the inverse intensity ratio of γ-fiber to α-fiber in the martensite and the tempered martensite, yet in either case the upper limit is around 3.00.

In this case, the inverse intensity ratio of γ-fiber to α-fiber in ferrite and in martensite and tempered martensite can be calculated as described below.

First, using wet polishing and buffing with a colloidal silica solution, smooth the surface of a cross section (L-cross section) of a steel sheet used as a sample taken in a sheet thickness direction parallel to the rolling direction. Then, etch the sample surface with 0.1 vol. % nital so as to reduce irregularities thereon as much as possible and completely remove the work affected layer. Then, perform crystal orientation measurement at a position of sheet thickness×¼ of the steel sheet (a position at a depth of one-fourth of the sheet thickness from the steel sheet surface) using SEM-EBSD (Electron Backscatter Diffraction). Using OIM Analysis (available from AMETEK EDAX), first select a martensite (including tempered martensite) grain containing adjacent ferrite grains with similar orientations using a grain highlighting function, and then extract the information only on the orientation of the martensite (including tempered martensite) grain using a chart function. By separately evaluating the texture information of the individual phases (ferrite, and martensite including tempered martensite) and determining the inverse intensity ratio of α-fiber and that of γ-fiber for each phase, the inverse intensity ratio of γ-fiber to α-fiber in ferrite and the inverse intensity ratio of γ-fiber to α-fiber in martensite and tempered martensite can be calculated.

According to the disclosure, by controlling the microstructure of the steel having the above chemical composition, it is possible to provide a high-strength steel sheet having a high Young's modulus and excellent in deep drawability and stretch flangeability. In addition, the high-strength steel sheet disclosed herein may be a cold-rolled steel sheet, or a coated or plated steel sheet having formed thereon a well-known and widely-used coating or plating such as a hot-dip galvanized coating, a galvannealed coating, an electrogalvanized plating, an Al coating or plating, or the like.

The following describes a method for producing the high-strength steel sheet according to the disclosure.

In the case of producing the steel sheet as CR, a cold-rolled steel sheet (without coating or plating), for example, the method includes: heating a steel slab having the above-described chemical composition obtained by continuous casting to a temperature range of 1150° C. to 1300° C. (hereinafter "the steel slab heating"); then subjecting the steel slab to hot rolling with a finisher delivery temperature from 850° C. to 1000° C. to form a hot-rolled steel sheet (hereinafter "the hot rolling"); then coiling the steel sheet in a temperature range of 500° C. to 800° C. (hereinafter "the coiling"); then optionally subjecting the steel sheet to pickling treatment (hereinafter "the pickling"); then subjecting the steel sheet to cold rolling at a cold rolling reduction of 40% or more to obtain a cold-rolled steel sheet (hereinafter "the cold rolling"); then subjecting the steel sheet to first heat treatment, whereby the cold-rolled steel sheet is further heated to a temperature range of 450° C. to 750° C. and retained for 300 s or more in the temperature range of 450° C. to 750° C. (hereinafter "the first heat treatment"); then subjecting the steel sheet to second heat treatment, whereby the steel sheet is heated to a temperature of 750° C. or higher and 950° C. or lower, and subsequently cooled to a cooling stop temperature of 50° C. or higher and 250° C. or lower with a mean cooling rate of 10° C./s or higher in a temperature range down to 500° C. (hereinafter "the second heat treatment"); and then subjecting the steel sheet to third heat treatment, whereby the steel sheet is heated to a temperature range of above 250° C. to 600° C. and retained for 10 s or more in the temperature range of above 250° C. to 600° C. (hereinafter "the third heat treatment").

In addition, in the case of producing the steel sheet as a coated or plated steel sheet, the steel sheet obtained as described above (the cold-rolled steel sheet after being subjected to the third heat treatment) is further subjected to coating or plating treatment. For example, the steel sheet obtained as described above is subjected to hot-dip galvanizing treatment to obtain a hot-dip galvanized steel sheet. After the hot-dip galvanizing treatment, alloying treatment is performed on the hot-dip galvanized coating to obtain a high-strength galvannealed steel sheet.

The following provides details of the aforementioned processes.

[Steel Slab Heating]

Nb- and V-based precipitates present at the stage of heating of a cast steel slab would remain, if left intact, as coarse precipitates in the resulting steel sheet, and would not contribute to improvement of the properties of the steel sheet, such as strength, Young's modulus, mean r value, and hole expansion formability. Therefore, when the steel slab is heated, it is necessary to redissolve Nb- and V-based precipitates precipitated during casting. This contribution to the properties can be obtained upon heating to 1150° C. or higher. In addition, to scale off defects such as blow holes or segregation in the slab surface layer and to obtain a smooth steel sheet surface with fewer cracks or irregularities, a preferred heating temperature is 1150° C. or higher. However, a heating temperature above 1300° C. causes austenite grains to coarsen, leading to coarsening of the resulting microstructure and deterioration of strength and ductility. Therefore, the steel slab is heated to a temperature range of 1150° C. to 1300° C. That is, the slab heating temperature is set to 1150° C. or higher and 1300° C. or lower.

[Hot Rolling]

The hot rolling includes rough rolling and finish rolling. The steel slab after subjection to the steel slab heating is subjected to this rough rolling and finish rolling to obtain a hot-rolled steel sheet. When the finisher delivery temperature in the hot rolling is higher than 1000° C., the amount of oxides (hot rolling scales) produced suddenly increases, which causes an increase in roughness of the interface between the steel substrate and oxides, resulting in degradation of surface quality after the subsequent pickling or cold rolling.

On the other hand, when the finisher delivery temperature in the hot rolling is lower than 850° C., the rolling burden increases due to increased rolling load, and such a low finisher delivery temperature causes a rise in the rolling reduction in an austenite non-recrystallization state and development of an abnormal texture as a result of rolling being performed in the presence of ferrite grains with nucleation sites. Consequently, the final product has a significant planar anisotropy, which not only increases the non-uniformity of material property, but also decreases the Young's modulus and mean r value themselves. Therefore, the finisher delivery temperature in the hot rolling is set to 850° C. or higher and 1000° C. or lower. The finisher delivery temperature is preferably 850° C. or higher. The finisher delivery temperature is preferably 950° C. or lower.

The steel slab is subjected to rough rolling under normal conditions and formed into a sheet bar. When the heating temperature is low, it is preferable to additionally heat the sheet bar using a bar heater or the like prior to finish rolling, from the viewpoint of preventing troubles during the hot rolling. Finish rolling may be performed continuously by joining rough-rolled sheets during the hot rolling. Rough-rolled sheets may be coiled on a temporary basis. At least part of finish rolling may be conducted as lubrication rolling to reduce rolling load in the hot rolling. Conducting lubrication rolling in such a manner is effective from the perspective of making the shape and material properties of the steel sheet uniform. In lubrication rolling, the coefficient of friction is preferably 0.10 or more. The coefficient of friction is preferably 0.25 or less.

[Coiling]

If the hot-rolled steel sheet after subjection to the hot rolling is coiled at a coiling temperature above 800° C., ferrite grains coarsen and orientation alignment is hindered during the cold rolling. In addition, carbonitrides of Nb and V coarsen, and the effect of suppressing recrystallization of ferrite during annealing and the effect of suppressing coarsening of austenite grains are reduced. On the other hand, if the coiling temperature is below 500° C., hard bainite and martensite form in addition to ferrite. This causes an increase in the amount of solute C, which would inhibit the development of texture during recrystallization annealing, and larger intra-grain orientation variations during the cold rolling. As a result, the texture obtained after the annealing does not develop into α-fiber or γ-fiber, particularly γ-fiber, and the Young's modulus and mean r value do not increase. Therefore, the coiling temperature is set to 500° C. or higher and 800° C. or lower. Specifically, after the hot rolling, the hot-rolled steel sheet is coiled in a temperature range of 500° C. to 800° C.

[Pickling]

In the case of subjecting the hot-rolled steel sheet obtained as described above to cold rolling, it is preferable to remove oxide scales on the surface of the hot-rolled steel sheet by pickling and then subject the steel sheet to cold rolling to obtain a cold-rolled steel sheet with a predetermined thickness. Pickling enables removal of oxides (scales) from the steel sheet surface, and is thus preferably performed to ensure that the high-strength steel sheet as the final product has good chemical convertibility and a sufficient coating or plating quality. The pickling may be performed in one or more batches.

[Cold Rolling]

After the hot rolling, the cold rolling is performed to achieve higher alignment with α- and γ-fibers, which are effective for increasing the Young's modulus and mean r value. Specifically, as a result of α- and γ-fibers being developed through the cold rolling, it becomes possible to form more ferrite grains with α- and γ-fibers, particularly γ-fiber, even in the microstructure resulting from the subsequent annealing, and to have a higher Young's modulus and a higher mean r value.

To obtain this effect, the cold rolling reduction in the cold rolling needs to be 40% or more. Further, from the perspective of increasing the Young's modulus and mean r value, the cold rolling reduction is preferably 50% or more. However, excessively increasing the cold rolling reduction causes a rise in rolling load, making production difficult. Thus, a preferred cold rolling reduction is 80% or less. Therefore, the cold rolling reduction is set to 40% or more. The cold rolling reduction is preferably 40% or more. The cold rolling reduction is preferably 80% or less. The cold rolling reduction is more preferably 50% or more. The cold rolling reduction is more preferably 80% or less. The effects of the disclosure can be obtained without specifying the number of rolling passes or the cold rolling reduction per pass.

[First Heat Treatment (Annealing)]

* First Heating

The annealing temperature (heating temperature) in a first heating is one of the important production factors. Specifically, the annealing temperature in the first heating is set to 450° C. or higher and 750° C. or lower, and it is necessary to make the texture of ferrite highly aligned with α- and γ-fibers, particularly γ-fiber. When the annealing temperature in the first heating is low, a large amount of non-recrystallized microstructures remains, which makes it difficult to achieve higher alignment with γ-fiber formed during recrystallization of ferrite. This results in a decrease in the Young's modulus and mean r value in every possible direction. Therefore, the annealing temperature is set to 450° C. or higher. Further, from the perspective of increasing the Young's modulus and mean r value, the annealing temperature is set to 500° C. or higher, and more preferably 550° C. or higher. On the other hand, if the annealing temperature is higher than 750° C., the volume fraction of austenite formed during the annealing increases and the volume fraction of ferrite aligned with α- and γ-fibers, particularly γ-fiber, decreases. This results in a decrease in the Young's modulus and mean r value in every possible direction.

In addition, in the case of performing cooling after the first heating and retaining treatment, ferrite, martensite, tempered martensite, bainite, or tempered bainite which are formed through transformation from austenite at the time of cooling, or a carbide such as pearlite, cementite, or the like would assume a texture different from that of ferrite as controlled during the first heating. Consequently, it becomes difficult to achieve alignment with α- and γ-fibers, particularly with γ-fiber. Therefore, the annealing temperature in the first heating is set to 750° C. or lower. Specifically, in the first heat treatment, the steel sheet is heated to a temperature range of 450° C. to 750° C. The steel sheet is preferably heated to a temperature range of 500° C. to 750° C., and more preferably to a temperature range of 550° C. to 750° C.

* Retaining Treatment after First Heating

The holding time in retaining treatment after the first heating is one of the important production factors. Specifically, the holding time in retaining treatment after the first heating is set to 300 s or more, and it is necessary to make the texture of ferrite highly aligned with α- and γ-fiber, particularly γ-fiber. If the holding time in the temperature range of 450° C. to 750° C. is less than 300 s, non-recrystallized microstructures would remain and increase the difficulty in achieving alignment with γ-fiber, causing a decrease in the Young's modulus and mean r value in every possible direction. Therefore, the holding time is set to 300 s or more. Although there is no particular limitation, in view of the fact that coarsening of recrystallized ferrite grains occurs and makes it difficult to guarantee a desired tensile strength TS if the holding time in retaining treatment after the first heating is more than 100,000 s, a preferred holding time is 100,000 s or less. Therefore, the holding time is set to 300 s or more. The holding time is preferably 300 s or more. The holding time is preferably 100,000 s or less. The holding time is more preferably 300 s or more. The holding time is more preferably 36,000 s or less. The holding time is even more preferably 300 s or more. The holding time is even more preferably 21,600 s or less.

In the production method disclosed herein, the first heating and retaining treatment after the first heating are collectively referred to as "the first heat treatment".

The heat treatment may be continuous annealing or batch annealing. In the case of performing cooling after the retaining treatment, the steel sheet may be cooled to room temperature, or may be subjected to a process whereby the steel sheet is passed through an overaging zone. No limitation is placed on the cooling process and cooling rate, and any cooling process may be used, such as furnace cooling or air cooling in batch annealing, or gas jet cooling, mist cooling, or water cooling in continuous annealing. Regarding the pickling, conventional methods may be followed. Although there is no particular limitation, in view of the fact that the steel sheet may suffer degradation in shape if the mean cooling rate in a temperature range up to room temperature or up to the overaging zone is higher than 80° C./s, the mean cooling rate is preferably 80° C./s or lower when cooling is performed.

[Second Heat Treatment (Annealing)]

* Second Heating

The annealing temperature (heating temperature) in the second heating is one of the important production factors in the disclosure. Specifically, the annealing temperature in the second heating needs to be set to 750° C. or higher and 950° C. or lower, and it is necessary to generate ferrite, martensite, and tempered martensite in at least a certain ratio. When the annealing temperature in the second heating is lower than 750° C., the formation of austenite becomes insufficient, and a sufficient amount of martensite cannot be obtained by cooling after heating, making it difficult to ensure a desired tensile strength TS. In addition, non-recrystallized microstructures remain, causing ductility to decrease. Therefore, the annealing temperature is set to 750° C. or higher. In addition, when the annealing temperature in the second heating is higher than 950° C., annealing is performed in the austenite single phase region, leading to a randomization of the texture of ferrite formed through the second heating followed by the retaining treatment, and a decrease in the Young's modulus and mean r value of the resulting steel sheet. Therefore, the annealing temperature is set to 950° C. or lower. Specifically, in the second heat treatment (annealing), the steel sheet is heated to a temperature range of 750° C. to 950° C. The steel sheet is preferably heated to a temperature range of 750° C. to 920° C., and more preferably to a temperature range of 750° C. to 890° C.

When the annealing temperature in the first heating is set to 750° C. and the annealing temperature in the second heating to 750° C., the first heat treatment and the second heat treatment may be a single continuous process.

* Cooling after Second Heating

When the mean cooling rate in a temperature range up to 500° C. is lower than 10° C./s during the cooling after the above-described second heating, untransformed austenite is caused to transform into pearlite, where the presence of a desired area ratio of martensite and tempered martensite cannot be ensured, and it becomes difficult to guarantee a desired tensile strength TS. Although there is no particular limitation, in view of the fact that the steel sheet may suffer degradation in shape and the cooling stop temperature may become difficult to control if the mean cooling rate is higher than 200° C./s, a preferred mean cooling rate is 200° C./s or lower. Therefore, the mean cooling rate in a temperature range down to 500° C. during the cooling after the second heating is set to 10° C./s or higher. The mean cooling rate is preferably 10° C./s or higher. The mean cooling rate is preferably 200° C./s or lower. The mean cooling rate is more preferably 10° C./s or higher. The mean cooling rate is more preferably 80° C./s or lower.

The cooling stop temperature in the cooling is one of the important production factors in the disclosure. Specifically, the cooling stop temperature needs to be set to 50° C. or higher and 250° C. or lower so as to form tempered martensite in at least a certain ratio. At the end of the cooling, austenite partially transforms into martensite and the remainder becomes untransformed austenite. Then, after heating the steel sheet (and, optionally, further subjecting it to coating or plating treatment or alloying treatment), the steel sheet is cooled to room temperature, whereby the martensite is caused to transform into tempered martensite and the untransformed austenite into martensite. In other words, the lower the cooling stop temperature in the cooling after the second heating, the more martensite and the less untransformed austenite are produced during the cooling. Thus, by controlling the cooling stop temperature, the final amount (area ratio or volume fraction) of martensite and tempered martensite can be controlled. In this respect, a cooling stop temperature above 250° C. leads to insufficient martensitic transformation at the end of the cooling, causing an increase in the amount of untransformed austenite. As a result, formation of the resulting martensite becomes excessive, causing the hole expansion formability to deteriorate. On the other hand, a cooling stop temperature below 50° C. causes most of austenite to transform into martensite during the cooling. This results in an increase in the amount of tempered martensite formed during the subsequent reheating (third heating), making it difficult to guarantee a desired TS. Therefore, the cooling stop temperature in the cooling after the second heating is set to 50° C. or higher and 250° C. or lower. The cooling stop temperature is preferably 50° C. or higher. The cooling stop temperature is preferably 200° C. or lower.

In the production method disclosed herein, the second heating and the cooling after the second heating are collectively referred to as "the second heat treatment".

[Third Heat Treatment (Reheating)]
* Third Heating

When the heating temperature in third heating performed after the second heat treatment is 250° C. or lower, tempering of martensite is insufficient, causing the hole expansion formability to deteriorate. On the other hand, when the heating temperature in the third heating is higher than 600° C., the untransformed austenite remaining at the end of the cooling after the second heating is caused to transform into pearlite, making it difficult to guarantee a desired tensile strength TS. Therefore, the heating temperature in the third heating is set to be higher than 250° C. and no higher than 600° C.

* Retaining Treatment after Third Heating

When the holding time in a temperature range of above 250° C. to 600° C. during the retaining treatment after the third heating is shorter than 10 s, the martensite formed during the cooling after the second heating is not sufficiently tempered, causing the hole expansion formability to deteriorate. Although there is no particular limitation, in view of the fact that when the holding time in the retaining treatment after the third heating is longer than 600 s, the untransformed austenite remaining at the end of the cooling after the second heating is caused to transform into bainite, which results in a reduction in the amount of martensite formed and a difficulty in guaranteeing a desired tensile strength TS, Therefore, the holding time in the retaining treatment after the third heating is set to 10 s or more. The holding time is preferably 10 s or more. The holding time is preferably 600 s or less.

In the production method disclosed herein, the third heating and the retaining treatment after the third heating are collectively referred to as "the third heat treatment".

In the case of producing the steel sheet as a cold-rolled steel sheet, the steel sheet may be subjected to a treatment such that the steel sheet is passed through an overaging zone during the above-described retaining treatment after the third heating.

Alternatively, in the case of producing as a coated or plated steel sheet, the steel sheet obtained as described above (the cold-rolled steel sheet after subjection to the third heat treatment) is further subjected to coating or plating treatment. Examples of the coating or plating treatment include galvanizing treatment such as hot-dip galvanizing, galvannealing, and electrogalvanizing, and Al coating or plating. In the case of producing the steel sheet as a hot-dip galvanized steel sheet, for example, hot-dip galvanizing treatment may be performed by passing the cold-rolled steel sheet after subjection to the third heat treatment through molten zinc. Alternatively, in the case of producing as a galvannealed steel sheet, after the hot-dip galvanizing treatment, alloying treatment may be further performed on the hot-dip galvanized coating or plating.

In the following, the hot-dip galvanizing treatment and alloying treatment are described.

[Hot-Dip Galvanizing Treatment]

If applicable, hot-dip galvanizing is preferably performed in a temperature range of 420° C. to 550° C., and it can be carried out, for example, during the cooling after the annealing (third heat treatment). Preferably, as the hot-dip galvanizing bath, a zinc bath containing 0.15 mass % to 0.23 mass % of Al is used for GI (hot-dip galvanized steel sheets), or a zinc bath containing 0.12 mass % to 0.20 mass % of Al for GA (galvannealed steel sheets). In addition, the coating weight is preferably 20 g/m² to 70 g/m² per side (in the case of double-sided coating). For GA, it is preferable to perform alloying treatment as described below so that the coating layer has an Fe concentration of 7 mass % to 15 mass %.

[Alloying Treatment]

In alloying treatment, an alloying treatment temperature below 470° C. causes the problem of alloying not being able to proceed. On the other hand, when the alloying treatment temperature is higher than 600° C., untransformed austenite remaining at the end of the cooling after the second heating is caused to transform into pearlite, and desired strength cannot be guaranteed. Therefore, the alloying treatment temperature is set to 470° C. or higher and 600° C. or lower. Specifically, the alloying treatment is performed on the galvanized coating or plating in a temperature range of 470° C. to 600° C.

As described above, according to the production method disclosed herein, by heating the steel sheet to a temperature range of 450° C. to 750° C. and then retaining in the temperature range of 450° C. to 750° C. in the first heat treatment, non-recrystallized ferrite is caused to undergo sufficient recrystallization, and textures, particularly γ-fiber, advantageous for increasing the Young's modulus and mean r value are developed. In addition, if the texture of ferrite is highly aligned with, among other things, γ-fiber in the first heat treatment, the textures formed in the first heat treatment will not change significantly in the subsequent second heat treatment even when martensite and tempered martensite have dispersed in the underlying ferrite as a result of annealing being performed in a ferrite-austenite dual phase region. In other words, such ferrite, martensite, and tempered martensite that are highly aligned with, among other things, γ-fiber are also formed in the resulting steel sheet, and it is possible to improve the strength effectively without decreasing the Young's modulus or mean r value.

The cold-rolled steel sheet, hot-dip galvanized steel sheet, or galvannealed steel sheet thus obtained after the heat treatment, coating or plating treatment, and/or alloying treatment as described above may be further subjected to skin pass rolling. When skin pass rolling is performed after the above-described heat treatment and coating or plating treatment, the elongation rate for skin pass rolling is preferably 0.1% or more. The elongation rate is preferably 1.5% or less. If the elongation rate for skin pass rolling is less than 0.1%, the shape correcting effect is small and such skin pass is difficult to control. Therefore, a preferred range for the elongation rate has a lower limit of 0.1%. On the other hand, if the elongation rate for skin pass rolling is more than 1.5%, the productivity is remarkably lowered. Therefore, a preferred range for the elongation rate has an upper limit of 1.5%. The skin pass rolling may be performed in-line or off-line. Skin pass may be performed in one or more batches to achieve a target rolling reduction.

EXAMPLES

The following describes examples of the present disclosure. Note that the disclosure is not limited to these examples.

Steels having the chemical compositions presented in Table 1, each with the balance consisting of Fe and incidental impurities, were prepared by steelmaking in a converter and formed into slabs by continuous casting. The steel slabs thus obtained were hot rolled under the conditions presented in Table 2 to obtain hot-rolled steel sheets. The hot-rolled steel sheets were then subjected to coiling, followed by pickling. The hot-rolled steel sheets were then subjected to cold rolling under the conditions in Table 2 to obtain cold-rolled steel sheets. The cold-rolled steel sheets were then subjected to heat treatment (first to third heat treatment) under the conditions in Table 2 ("CR": cold-rolled steel sheets without coating or plating). After the third heat treatment step, some were subjected to hot-dip galvanizing treatment ("GI": hot-dip galvanized steel sheets). In addition, some were subjected to hot-dip galvanizing treatment followed by alloying treatment ("GA": galvannealed steel sheets).

Used as hot-dip galvanizing baths were a zinc bath containing 0.18 mass % of Al for GI and a zinc bath containing 0.15 mass % of Al for GA, in either case the bath temperature was set to 470° C. The coating weight per side was set to 45 g/m² per side (in the case of double-sided coating), and the Fe concentration in the coated layer of each galvannealed steel sheet (GA) was adjusted in a range of 9 mass % to 12 mass %.

TABLE 1

| Steel | Chemical Composition (mass %) | | | | | | | | | | |
|---|---|---|---|---|---|---|---|---|---|---|---|
| ID | C | Si | Mn | P | S | Al | N | Nb | V | Cr | Mo |
| A | 0.163 | 1.05 | 2.67 | 0.016 | 0.0011 | 0.029 | 0.0036 | 0.182 | 0.052 | — | — |
| B | 0.145 | 1.49 | 1.99 | 0.015 | 0.0021 | 0.034 | 0.0035 | 0.061 | 0.085 | — | — |
| C | 0.095 | 2.11 | 1.65 | 0.011 | 0.0013 | 0.027 | 0.0037 | 0.012 | 0.123 | — | — |
| D | 0.133 | 1.50 | 2.29 | 0.014 | 0.0017 | 0.005 | 0.0031 | 0.019 | 0.096 | — | — |
| E | 0.107 | 1.59 | 2.35 | 0.030 | 0.0023 | 0.029 | 0.0029 | 0.142 | 0.056 | — | — |
| F | 0.095 | 2.19 | 1.07 | 0.022 | 0.0026 | 0.026 | 0.0030 | 0.101 | 0.091 | — | — |
| G | 0.159 | 0.54 | 2.91 | 0.018 | 0.0029 | 0.034 | 0.0035 | 0.035 | 0.113 | — | — |
| H | 0.056 | 1.18 | 2.73 | 0.026 | 0.0022 | 0.029 | 0.0036 | 0.013 | 0.004 | — | — |
| I | 0.089 | 0.46 | 2.20 | 0.013 | 0.0027 | 0.033 | 0.0032 | 0.125 | 0.063 | — | — |
| J | 0.087 | 1.12 | 0.85 | 0.025 | 0.0021 | 0.036 | 0.0037 | 0.026 | 0.115 | — | — |
| K | 0.161 | 1.45 | 3.14 | 0.029 | 0.0026 | 0.028 | 0.0036 | 0.196 | 0.045 | — | — |
| L | 0.079 | 1.07 | 1.15 | 0.025 | 0.0023 | 0.338 | 0.0042 | 0.082 | 0.092 | — | — |
| M | 0.137 | 1.58 | 2.16 | 0.023 | 0.0019 | 0.029 | 0.0027 | 0.001 | 0.002 | — | — |
| N | 0.121 | 1.21 | 2.07 | 0.028 | 0.0027 | 0.695 | 0.0035 | 0.181 | 0.037 | 0.15 | 0.19 |
| O | 0.086 | 1.89 | 1.83 | 0.027 | 0.0018 | 0.033 | 0.0036 | 0.129 | 0.081 | — | — |
| P | 0.085 | 1.08 | 1.17 | 0.025 | 0.0020 | 0.351 | 0.0043 | 0.032 | 0.121 | — | — |
| Q | 0.137 | 1.57 | 2.16 | 0.023 | 0.0019 | 0.028 | 0.0028 | 0.195 | 0.053 | — | — |
| R | 0.143 | 0.99 | 2.97 | 0.017 | 0.0017 | 0.036 | 0.0037 | 0.055 | 0.192 | — | — |
| S | 0.099 | 1.33 | 2.43 | 0.022 | 0.0019 | 0.031 | 0.0032 | 0.003 | 0.089 | — | — |
| T | 0.091 | 1.79 | 1.64 | 0.018 | 0.0021 | 0.029 | 0.0042 | 0.163 | 0.034 | — | — |
| U | 0.139 | 0.91 | 2.67 | 0.025 | 0.0023 | 0.028 | 0.0046 | 0.017 | 0.128 | — | — |
| V | 0.118 | 1.13 | 2.59 | 0.028 | 0.0016 | 0.026 | 0.0038 | 0.049 | 0.146 | — | — |

TABLE 1-continued

| | | | | | | | | | | | |
|---|---|---|---|---|---|---|---|---|---|---|---|
| W | 0.082 | 2.05 | 1.81 | 0.016 | 0.0025 | 0.031 | 0.0039 | 0.012 | 0.098 | — | — |
| X | 0.147 | 0.64 | 2.69 | 0.021 | 0.0030 | 0.046 | 0.0048 | 0.029 | 0.152 | — | — |

| Steel ID | Chemical Composition (mass %) | | | | | | | | C* (mass ppm) | Remarks |
|---|---|---|---|---|---|---|---|---|---|---|
| | Ni | Cu | B | Ca | Mg | REM | Ta | Sn | Sb | | |
| A | — | — | — | — | — | — | — | — | — | 1272 | Conforming steel |
| B | — | — | — | — | — | — | — | — | — | 1171 | Conforming steel |
| C | — | — | — | — | — | — | — | — | — | 645 | Conforming steel |
| D | — | — | — | — | — | — | — | — | — | 1079 | Conforming steel |
| E | — | — | — | — | — | — | — | — | — | 755 | Conforming steel |
| F | — | — | — | — | — | — | — | — | — | 605 | Conforming steel |
| G | — | — | — | — | — | — | — | — | — | 1278 | Conforming steel |
| H | — | — | — | — | — | — | — | — | — | 534 | Comparative steel |
| I | — | — | — | — | — | — | — | — | — | 580 | Comparative steel |
| J | — | — | — | — | — | — | — | — | — | 565 | Comparative steel |
| K | — | — | — | — | — | — | — | — | — | 1251 | Comparative steel |
| L | — | — | — | — | — | — | — | — | — | <u>467</u> | Comparative steel |
| M | — | — | — | — | — | — | — | — | — | <u>1364</u> | Comparative steel |
| N | — | — | — | — | — | — | — | — | — | 889 | Conforming steel |
| O | 0.21 | 0.14 | — | — | — | — | — | — | — | 502 | Conforming steel |
| P | — | — | 0.0015 | — | — | — | — | — | — | 523 | Conforming steel |
| Q | — | — | — | 0.0016 | — | 0.0017 | — | — | — | 993 | Conforming steel |
| R | — | — | — | — | 0.0024 | — | — | — | — | 906 | Conforming steel |
| S | — | — | — | — | — | — | 0.0073 | — | — | 771 | Conforming steel |
| T | — | — | — | — | — | — | 0.0065 | — | — | 615 | Conforming steel |
| U | — | — | — | — | — | — | — | 0.0058 | — | 1066 | Conforming steel |
| V | — | — | — | — | — | — | — | 0.0061 | — | 773 | Conforming steel |
| W | — | — | — | — | — | — | — | — | 0.0067 | 573 | Conforming steel |
| X | — | — | — | — | — | — | — | — | 0.0059 | 1074 | Conforming steel |

Underlined if outside the appropriate range.
"C*":C* = (C − (12.0/92.9) × Nb − (12.0/50.9) × V − (12.0/180.9) × Ta) × 10000, where each element symbol indicates content (mass %) of the corresponding element.
(Note:
If Ta is not contained, C* is calculated with Ta = 0.)

TABLE 2

| | | Finisher | | | | First heat treatment | | Second heat treatment |
|---|---|---|---|---|---|---|---|---|
| No. | Steel ID | Slab heating temp. (° C.) | delivery temp. (° C.) | Coiling temp. after hot rolling (° C.) | Cold rolling reduction (%) | Annealing temp. (° C.) | Holding time (s) | Annealing temp. (° C.) |
| 1 | A | 1250 | 900 | 600 | 70 | 600 | 10000 | 845 |
| 2 | A | 1250 | 900 | 600 | 80 | 700 | 10000 | 810 |
| 3 | A | 1250 | 900 | 600 | 50 | 700 | 10000 | 810 |
| 4 | A | <u>1100</u> | 900 | 600 | 70 | 550 | 10000 | 810 |
| 5 | A | 1250 | <u>800</u> | 600 | 70 | 550 | 10000 | 810 |
| 6 | A | 1250 | 900 | <u>450</u> | 70 | 550 | 10000 | 810 |
| 7 | A | 1250 | 900 | 600 | <u>30</u> | 700 | 10000 | 810 |
| 8 | A | 1250 | 900 | 600 | 70 | <u>400</u> | 10000 | 810 |
| 9 | A | 1250 | 900 | 600 | 70 | 700 | <u>200</u> | 810 |
| 10 | A | 1250 | 900 | 600 | 70 | 600 | 10000 | <u>700</u> |
| 11 | A | 1250 | 900 | 600 | 70 | 600 | 10000 | 810 |
| 12 | A | 1250 | 900 | 600 | 70 | 600 | 10000 | 810 |
| 13 | A | 1250 | 900 | 600 | 70 | 600 | 10000 | 810 |
| 14 | A | 1250 | 900 | 600 | 70 | 600 | 10000 | 810 |
| 15 | A | 1250 | 900 | 600 | 70 | 600 | 10000 | 810 |
| 16 | B | 1200 | 900 | 600 | 90 | 450 | 1000 | 810 |
| 17 | C | 1150 | 900 | 600 | 65 | 750 | 1000 | 950 |
| 18 | D | 1300 | 900 | 800 | 40 | 750 | 20000 | 790 |
| 19 | D | 1300 | 900 | 800 | 40 | 750 | 20000 | 790 |
| 20 | D | 1300 | 900 | 800 | 40 | 750 | 20000 | 790 |
| 21 | E | 1250 | 850 | 600 | 65 | 650 | 15000 | 850 |
| 22 | F | 1250 | 850 | 600 | 65 | 650 | 15000 | 750 |
| 23 | G | 1250 | 1000 | 600 | 60 | 650 | 15000 | 830 |
| 24 | H | 1250 | 950 | 600 | 75 | 550 | 15000 | 810 |
| 25 | I | 1250 | 950 | 600 | 75 | 550 | 15000 | 810 |
| 26 | J | 1250 | 900 | 600 | 70 | 650 | 20000 | 810 |
| 27 | K | 1250 | 900 | 600 | 70 | 650 | 20000 | 810 |
| 28 | L | 1250 | 900 | 600 | 70 | 650 | 20000 | 810 |
| 29 | M | 1250 | 900 | 600 | 70 | 650 | 20000 | 810 |
| 30 | N | 1250 | 900 | 600 | 70 | 650 | 20000 | 810 |
| 31 | O | 1250 | 900 | 600 | 70 | 650 | 20000 | 810 |
| 32 | P | 1250 | 900 | 600 | 70 | 650 | 15000 | 810 |
| 33 | Q | 1250 | 900 | 600 | 70 | 650 | 15000 | 810 |

TABLE 2-continued

| No. | | | | | | | | |
|---|---|---|---|---|---|---|---|---|
| 34 | R | 1250 | 900 | 500 | 65 | 600 | 15000 | 790 |
| 35 | S | 1250 | 900 | 500 | 65 | 600 | 15000 | 790 |
| 36 | T | 1250 | 900 | 500 | 65 | 600 | 20000 | 790 |
| 37 | U | 1250 | 900 | 700 | 65 | 600 | 20000 | 810 |
| 38 | V | 1250 | 900 | 700 | 65 | 600 | 20000 | 810 |
| 39 | W | 1250 | 900 | 700 | 65 | 600 | 20000 | 810 |
| 40 | X | 1250 | 900 | 750 | 75 | 700 | 20000 | 845 |

| | Second heat treatment | | Third heat treatment | | Alloying | | |
|---|---|---|---|---|---|---|---|
| No. | Mean cooling rate (° C./s) | Cooling stop temp. (° C.) | Heating temp. (° C.) | Holding time (s) | treatment temp. (° C.) | Type* | Remarks |
| 1 | 15 | 150 | 300 | 200 | — | CR | Example |
| 2 | 15 | 150 | 300 | 200 | — | GI | Example |
| 3 | 15 | 150 | 300 | 200 | 550 | GA | Example |
| 4 | 15 | 150 | 300 | 200 | — | GI | Comparative Example |
| 5 | 15 | 150 | 300 | 200 | 570 | GA | Comparative Example |
| 6 | 15 | 150 | 300 | 200 | — | CR | Comparative Example |
| 7 | 15 | 150 | 300 | 200 | 560 | GA | Comparative Example |
| 8 | 15 | 150 | 300 | 200 | — | CR | Comparative Example |
| 9 | 15 | 150 | 300 | 200 | — | GI | Comparative Example |
| 10 | 15 | 150 | 300 | 200 | — | CR | Comparative Example |
| 11 | <u>1</u> | 150 | 300 | 200 | — | GI | Comparative Example |
| 12 | 15 | <u>300</u> | 400 | 150 | — | CR | Comparative Example |
| 13 | 15 | 150 | <u>650</u> | 10 | — | GI | Comparative Example |
| 14 | 15 | 150 | 300 | <u>5</u> | — | CR | Comparative Example |
| 15 | 15 | 150 | 300 | 200 | <u>700</u> | GA | Comparative Example |
| 16 | 20 | 100 | 260 | 600 | — | GI | Example |
| 17 | 15 | 50 | 260 | 500 | 560 | GA | Example |
| 18 | 15 | 200 | 300 | 200 | — | CR | Example |
| 19 | 15 | 200 | 300 | 200 | — | GI | Example |
| 20 | 15 | 200 | 300 | 200 | 530 | GA | Example |
| 21 | 15 | 250 | 350 | 200 | — | CR | Example |
| 22 | 15 | 50 | 260 | 500 | — | CR | Example |
| 23 | 15 | 150 | 550 | 50 | — | GI | Example |
| 24 | 10 | 150 | 550 | 50 | — | CR | Comparative Example |
| 25 | 15 | 150 | 550 | 50 | — | GI | Comparative Example |
| 26 | 15 | 150 | 550 | 50 | 560 | GA | Comparative Example |
| 27 | 15 | 150 | 550 | 50 | — | CR | Comparative Example |
| 28 | 15 | 150 | 550 | 50 | 560 | GA | Comparative Example |
| 29 | 15 | 150 | 550 | 50 | — | GI | Comparative Example |
| 30 | 15 | 150 | 550 | 50 | — | CR | Example |
| 31 | 15 | 150 | 550 | 50 | 550 | GA | Example |
| 32 | 15 | 150 | 550 | 50 | — | GI | Example |
| 33 | 15 | 150 | 550 | 50 | 570 | GA | Example |
| 34 | 15 | 100 | 500 | 100 | — | CR | Example |
| 35 | 15 | 100 | 500 | 100 | — | GI | Example |
| 36 | 15 | 100 | 500 | 100 | — | CR | Example |
| 37 | 10 | 150 | 450 | 150 | — | GI | Example |
| 38 | 15 | 150 | 450 | 150 | 560 | GA | Example |
| 39 | 15 | 150 | 450 | 150 | — | GI | Example |
| 40 | 15 | 200 | 600 | 10 | 550 | GA | Example |

Underline if outside the appropriate range.
*CR: cold-rolled steel sheet (without coating or plating)/
GI: hot-dip galvanized steel sheet (without alloying treatment of galvanized layer)/
GA: galvannealed steel sheet Using each steel sheet obtained through the above process as a sample, mechanical properties were evaluated. Mechanical properties of each sample were evaluated by performing tensile test, Young's modulus measurement, mean r value measurement, and hole expanding test in the below-described manner.

The evaluation results are listed in Table 3. Table 3 also lists the sheet thickness of each sample steel sheet.

[Tensile Test]

In this case, tensile test was performed in accordance with JIS Z 2241:2011 on JIS No. 5 test pieces that were collected from the corresponding steel sheets subjected to skin pass rolling (temper rolling) at an elongation rate of 0.5% and that were tensioned in a direction orthogonal to the rolling direction of the corresponding steel sheets, and measurement was made of tensile strength TS and total elongation EL for each test piece.

[Young's Modulus Measurement]

Young's modulus measurement was performed in accordance with C1259, which is a standard specified by the American Society to Testing Materials, using a device for measuring transverse vibrational resonant frequency, on three test pieces of 10 mm×50 mm collected from the corresponding steel sheet so that their longitudinal directions were respectively in the direction of 0° (L direction), 45° (D direction), and 90° (C direction) with respect to the rolling direction of the steel sheet.

The Young's modulus of a steel sheet was determined to be good when the steel sheet had a Young's modulus of 205 GPa or more in the 0° direction (L direction) and 45° direction (D direction) and of 220 GPa or more in the 90° direction (C direction) with respect to the rolling direction.

[Mean r Value Measurement]

Mean r value measurement was performed in accordance with JIS Z 2201:1998, which is a standard specified by the Japanese Industrial Standards Committee, on three JIS No. 5 test pieces collected from the corresponding steel sheet so that their longitudinal directions were respectively in the direction of 0° (L direction), 45° (D direction), and 90° (C direction) with respect to the rolling direction of the steel sheet, and their plastic strain ratios $r_L$, $r_D$, $r_C$ were respectively determined in accordance with JIS Z 2254, and a mean r value was obtained by averaging the results as:

mean $r$ value=$(r_L+2r_D+r_C)/4$

The mean r value of a steel sheet was determined to be good when the following relationship was satisfied: mean r value ≥1.05.

[Hole Expanding Test]

Hole expanding test was performed in accordance with JIS Z 2256:2010. Specifically, each of the steel sheets obtained was cut to a size of 100 mm×100 mm, and a hole of 10 mm in diameter was drilled through each sample with a clearance of 12%±1%. Then, each sample was clamped into a die having an inner diameter of 75 mm with a blank holding force of 9 tons (88.26 kN). In this state, a conical punch of 60° was pushed into the hole, and the hole diameter at the crack initiation limit was measured. Then, to evaluate hole expansion formability, the maximum hole expansion ratio X (%) was calculated by:

maximum hole expansion ratio $\lambda(\%)=\{(D_f-D_0)/D_0\}\times 100$ where $D_f$ is a hole diameter (mm) at the time of occurrence of cracking and $D_0$ is an initial hole diameter (mm). The hole expansion formability of a steel sheet was determined to be good when the following relationship was satisfied: maximum hole expansion ratio $\lambda \geq 20\%$.

Further, according to the above-mentioned method, measurement was made of the area ratio of ferrite, the area ratio of martensite, and the area ratio of tempered martensite for each sample, and of the inverse intensity ratio of γ-fiber to α-fiber in ferrite and the inverse intensity ratio of γ-fiber to α-fiber in martensite and tempered martensite at a position of sheet thickness×¼ of the corresponding steel sheet. The results are listed in Table 3.

TABLE 3

| No. | Steel ID | Sheet thickness (mm) | Area ratio of F (%) | Area ratio of M (%) | Area ratio of tempered M (%) | Mean grain size of F (μm) | Inverse intensity ratio of γ-fiber to α-fiber F | M (incl. tempered M) | Remainder |
|---|---|---|---|---|---|---|---|---|---|
| 1 | A | 1.2 | 52 | 18 | 29 | 7.4 | 1.30 | 1.11 | θ |
| 2 | A | 0.8 | 63 | 14 | 21 | 6.3 | 1.28 | 1.08 | θ |
| 3 | A | 2.0 | 66 | 13 | 19 | 11.5 | 1.32 | 1.11 | B + θ |
| 4 | A | 1.2 | 60 | 15 | 23 | 18.7 | <u>0.97</u> | <u>0.89</u> | θ |
| 5 | A | 1.2 | 65 | 12 | 22 | 6.2 | <u>0.98</u> | <u>0.94</u> | θ |
| 6 | A | 1.2 | 64 | 15 | 19 | 6.7 | <u>0.84</u> | <u>0.95</u> | θ |
| 7 | A | 2.8 | 79 | 9 | 10 | 11.1 | <u>0.97</u> | <u>0.94</u> | B + θ |
| 8 | A | 1.2 | 59 | 18 | 20 | 4.9 | <u>0.94</u> | <u>0.85</u> | θ |
| 9 | A | 1.2 | 67 | 16 | 16 | 5.3 | <u>0.88</u> | <u>0.97</u> | θ |
| 10 | A | 1.2 | 81 | <u>3</u> | <u>2</u> | 8.3 | 1.28 | 1.11 | θ |
| 11 | A | 1.2 | 82 | <u>3</u> | <u>1</u> | 8.0 | 1.29 | 1.06 | θ |
| 12 | A | 1.2 | 67 | 29 | <u>0</u> | 8.4 | 1.24 | 1.01 | θ |
| 13 | A | 1.2 | 61 | <u>3</u> | 22 | 8.1 | 1.27 | 1.08 | P + θ |
| 14 | A | 1.2 | 68 | 25 | <u>4</u> | 7.2 | 1.29 | 1.04 | θ |
| 15 | A | 1.2 | 62 | <u>4</u> | 24 | 8.7 | 1.27 | 1.07 | B + P + θ |
| 16 | B | 0.4 | 64 | 8 | 26 | 2.4 | 1.34 | 1.06 | θ |
| 17 | C | 1.4 | 21 | 16 | 53 | 6.1 | 1.32 | 1.10 | B + θ |
| 18 | D | 2.4 | 59 | 17 | 21 | 9.4 | 1.28 | 1.08 | θ |
| 19 | D | 2.4 | 66 | 10 | 22 | 8.2 | 1.30 | 1.09 | θ |
| 20 | D | 2.4 | 58 | 16 | 23 | 9.4 | 1.27 | 1.08 | B + θ |
| 21 | E | 1.4 | 72 | 11 | 14 | 7.2 | 1.32 | 1.14 | θ |
| 22 | F | 1.4 | 69 | 10 | 19 | 7.6 | 1.31 | 1.13 | θ |
| 23 | G | 1.6 | 68 | 11 | 19 | 6.8 | 1.32 | 1.17 | θ |
| 24 | H | 1.0 | 86 | <u>3</u> | <u>4</u> | <u>21.6</u> | 1.27 | 1.08 | B + θ |
| 25 | I | 1.0 | 69 | 12 | 15 | 7.2 | 1.25 | 1.05 | θ |
| 26 | J | 1.2 | 85 | <u>4</u> | <u>4</u> | 8.1 | 1.31 | 1.11 | P + θ |
| 27 | K | 1.2 | <u>16</u> | 33 | 49 | 7.0 | <u>0.96</u> | <u>0.97</u> | θ |
| 28 | L | 1.2 | 88 | 3 | 3 | 19.6 | 1.33 | 1.12 | θ |
| 29 | M | 1.2 | 46 | 17 | 34 | 5.9 | <u>0.92</u> | <u>0.93</u> | B + θ |
| 30 | N | 1.2 | 71 | 14 | 14 | 5.4 | 1.32 | 1.11 | θ |
| 31 | O | 1.2 | 64 | 16 | 18 | 5.1 | 1.28 | 1.08 | B + θ |
| 32 | P | 1.2 | 57 | 15 | 25 | 6.5 | 1.26 | 1.08 | θ |
| 33 | Q | 1.2 | 49 | 16 | 32 | 7.4 | 1.30 | 1.09 | B + θ |
| 34 | R | 1.4 | 47 | 20 | 31 | 7.7 | 1.32 | 1.14 | θ |
| 35 | S | 1.4 | 67 | 13 | 19 | 8.2 | 1.29 | 1.12 | θ |
| 36 | T | 1.4 | 50 | 18 | 30 | 7.9 | 1.31 | 1.11 | θ |
| 37 | U | 1.4 | 73 | 9 | 16 | 7.5 | 1.31 | 1.13 | θ |
| 38 | V | 1.4 | 66 | 12 | 19 | 7.4 | 1.27 | 1.12 | B + θ |
| 39 | W | 1.4 | 42 | 23 | 33 | 8.2 | 1.29 | 1.09 | θ |
| 40 | X | 1.0 | 45 | 18 | 27 | 5.1 | 1.31 | 1.12 | B + θ |

TABLE 3-continued

| No. | TS (MPa) | EL (%) | Young's modulus (GPA) | | | Mean r value | λ (%) | Remarks |
| --- | --- | --- | --- | --- | --- | --- | --- | --- |
| | | | L direction | D direction | C direction | | | |
| 1 | 884 | 18.9 | 210 | 209 | 231 | 1.17 | 26 | Example |
| 2 | 899 | 17.9 | 212 | 210 | 224 | 1.19 | 27 | Example |
| 3 | 891 | 18.7 | 212 | 209 | 225 | 1.13 | 25 | Example |
| 4 | <u>776</u> | 14.3 | <u>201</u> | 205 | <u>209</u> | <u>0.94</u> | <u>18</u> | Comparative Example |
| 5 | 901 | 16.6 | 207 | <u>200</u> | <u>217</u> | <u>0.89</u> | 25 | Comparative Example |
| 6 | 908 | 18.2 | 209 | <u>196</u> | 225 | <u>0.91</u> | 26 | Comparative Example |
| 7 | 786 | 20.8 | 206 | <u>203</u> | <u>209</u> | <u>0.90</u> | 31 | Comparative Example |
| 8 | 916 | 17.0 | 219 | <u>199</u> | 242 | 1.06 | 25 | Comparative Example |
| 9 | 881 | 18.9 | 213 | <u>200</u> | 225 | 1.17 | 26 | Comparative Example |
| 10 | <u>759</u> | 20.9 | 212 | 208 | 231 | 1.21 | 32 | Comparative Example |
| 11 | <u>776</u> | 19.9 | 211 | 209 | 226 | 1.26 | 32 | Comparative Example |
| 12 | 887 | 18.4 | 212 | 211 | 227 | 1.18 | <u>19</u> | Comparative Example |
| 13 | <u>773</u> | 18.9 | 208 | 207 | 226 | 1.15 | 30 | Comparative Example |
| 14 | 898 | 19.9 | 211 | 208 | 229 | 1.21 | <u>18</u> | Comparative Example |
| 15 | <u>779</u> | 17.9 | 212 | 205 | 222 | 1.24 | 32 | Comparative Example |
| 16 | 1019 | 14.5 | 210 | 208 | 225 | 1.11 | 23 | Example |
| 17 | 982 | 16.9 | 209 | 208 | 221 | 1.20 | 25 | Example |
| 18 | 1001 | 15.5 | 211 | 206 | 229 | 1.14 | 26 | Example |
| 19 | 997 | 16.0 | 210 | 209 | 226 | 1.12 | 23 | Example |
| 20 | 1012 | 15.4 | 209 | 207 | 225 | 1.11 | 22 | Example |
| 21 | 985 | 16.1 | 208 | 208 | 228 | 1.06 | 23 | Example |
| 22 | 914 | 16.3 | 209 | 208 | 229 | 1.11 | 24 | Example |
| 23 | 792 | 18.9 | 211 | 210 | 220 | 1.21 | 28 | Example |
| 24 | <u>763</u> | 19.4 | 209 | 206 | 227 | 1.19 | 29 | Comparative Example |
| 25 | <u>776</u> | 20.4 | 210 | <u>196</u> | 221 | <u>0.89</u> | 28 | Comparative Example |
| 26 | <u>764</u> | 19.2 | 209 | 207 | 224 | 1.12 | 31 | Comparative Example |
| 27 | 1093 | 14.1 | 208 | <u>202</u> | 216 | <u>0.97</u> | 22 | Comparative Example |
| 28 | <u>766</u> | 19.2 | 211 | 208 | 224 | 1.10 | 32 | Comparative Example |
| 29 | 992 | 15.1 | 208 | 197 | 223 | <u>0.96</u> | 24 | Comparative Example |
| 30 | 906 | 18.7 | 210 | 208 | 228 | 1.23 | 28 | Example |
| 31 | 884 | 19.0 | 208 | 207 | 224 | 1.18 | 28 | Example |
| 32 | 905 | 16.7 | 211 | 208 | 223 | 1.21 | 27 | Example |
| 33 | 897 | 17.9 | 208 | 207 | 227 | 1.12 | 26 | Example |
| 34 | 896 | 16.4 | 209 | 206 | 229 | 1.06 | 24 | Example |
| 35 | 879 | 18.9 | 213 | 211 | 226 | 1.22 | 28 | Example |
| 36 | 910 | 18.0 | 209 | 206 | 228 | 1.07 | 24 | Example |
| 37 | 921 | 17.5 | 208 | 207 | 220 | 1.06 | 28 | Example |
| 38 | 814 | 19.3 | 211 | 206 | 225 | 1.21 | 31 | Example |
| 39 | 1003 | 15.9 | 213 | 207 | 223 | 1.13 | 22 | Example |
| 40 | 931 | 16.2 | 207 | 206 | 222 | 1.09 | 26 | Example |

Underlined if outside the appropriate range.
"F": ferrite,
"M": martensite,
"tempered M": tempered martensite,
"B": bainite (incl. tempered bainite),
"P": pearlite,
θ: carbide such as cementite As presented in Table 3, all of our examples exhibit desired mechanical properties, including a tensile strength TS of 780 MPa or more, Young's moduli as high as 205 GPa or more in the 0° and 45° directions and as high as 220 GPa or more in the 90° direction with respect to the rolling direction, and excellent deep drawability and stretch flangeability with a mean r value of 1.05 or more and a maximum hole expansion ratio λ of 20% or more. In contrast, comparative examples are inferior in at least one of TS, Young's moduli, mean r value, or λ.

Although some embodiments of the disclosure have been described above, this disclosure is not limited by the description that forms part of the disclosure in relation to the embodiments. That is, a person skilled in the art may make various modifications to the embodiments, examples, and operation techniques disclosed herein, and all such modifications will still fall within the scope of the claims which follow. For example, in the above-described series of heat treatment processes in the production method disclosed herein, any apparatus or the like may be used to perform the processes on the steel sheet as long as the thermal hysteresis conditions are met.

The present disclosure is also applicable to other steel sheets such as electrogalvanized steel sheets to obtain high-strength steel sheets, and still offers the same effect.

INDUSTRIAL APPLICABILITY

High-strength steel sheets according to the disclosure are highly beneficial in industrial terms because, for example, they can improve fuel efficiency by a reduction in the weight of automotive bodies when applied to automobile structural parts.

The invention claimed is:
1. A high-strength steel sheet, having a tensile strength of 780 MPa or more, comprising:
a chemical composition that contains, by mass %, C: 0.060% or more and 0.200% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, Nb: 0.001% or more and 0.200% or less, V: 0.001% or more and 0.200% or less, and the balance being Fe and incidental impurities, the chemical composition satisfying a relation of 500≤C*≤1300, where C* is determined by formula (1) given below; and a microstructure that contains ferrite in an area ratio of 20% or more and 80% or less, martensite in an area ratio of 5% or more, and tempered martensite in an area ratio of 5% or more and 60% or less, the ferrite having a mean grain size of 20.0 µm or less, and an inverse intensity ratio of γ fiber to α-fiber in the ferrite being 1.00 or more and an inverse intensity ratio of γ-fiber to α-fiber in the martensite and the tempered martensite being 1.00 or more, where the α-fiber is a fiber texture in which <110> axis is parallel to rolling direction and the γ-fiber is a fiber texture in which <111> axis is parallel to normal direction to rolled surface:

$$C^*=(C-(12.0/92.9)\times Nb-(12.0/50.9)\times V)\times 10000 \quad (1),$$

where each of the element symbols C, Nb, and V indicates content by mass % of the corresponding element in the steel sheet, and the unit of C* is mass ppm.

2. The high-strength steel sheet according to claim 1, wherein the high-strength steel sheet is a cold-rolled steel sheet.

3. The high-strength steel sheet according to claim 1, wherein the high-strength steel sheet comprises a coating or plating on a surface thereof.

4. The high-strength steel sheet according to claim 1, wherein the microstructure contains martensite in an area ratio of 8% or more.

5. The high-strength steel sheet according to claim 1, wherein the microstructure contains tempered martensite in an area ratio of 14% or more and 60% or less.

6. The high-strength steel sheet according to claim 3, wherein the coating or plating is a galvanized coating or plating.

7. A high-strength steel sheet, having a tensile strength of 780 MPa or more, comprising:

a chemical composition that contains, by mass %, C: 0.060% or more and 0.200% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, Nb: 0.001% or more and 0.200% or less, V: 0.001% or more and 0.200% or less, and at least one selected from groups (a) to (e):
(a) at least one selected from Cr: 0.05% or more and 1.00% or less, Mo: 0.05% or more and 1.00% or less, Ni: 0.05% or more and 1.00% or less, and Cu: 0.05% or more and 1.00% or less;
(b) B: 0.0003% or more and 0.0050% or less;
(c) at least one selected from Ca: 0.0010% or more and 0.0050% or less, Mg: 0.0005% or more and 0.0100% or less, and REM: 0.0003% or more and 0.0050% or less;
(d) at least one selected from Sn: 0.0020% or more and 0.2000% or less and Sb: 0.0020% or more and 0.2000% or less; and
(e) Ta: 0.0010% or more and 0.1000% or less; and the balance being Fe and incidental impurities, the chemical composition satisfying a relation of 500≤C*≤1300, where C* is determined by formula (1) or (2) given below; and a microstructure that contains ferrite in an area ratio of 20% or more and 80% or less, martensite in an area ratio of 5% or more, and tempered martensite in an area ratio of 5% or more and 60% or less, the ferrite having a mean grain size of 20.0 µm or less, and an inverse intensity ratio of γ-fiber to α-fiber in the ferrite being 1.00 or more and an inverse intensity ratio of γ-fiber to α-fiber in the martensite and the tempered martensite being 1.00 or more, where the α-fiber is a fiber texture in which <110> axis is parallel to rolling direction and the γ-fiber is a fiber texture in which <111> axis is parallel to normal direction to rolled surface:

in the case of the chemical composition not containing Ta, $$C^*=(C-(12.0/92.9)\times Nb-(12.0/50.9)\times V)\times 10000 \quad (1),$$

in the case of the chemical composition containing Ta, $$C^*=(C-(12.0/92.9)\times Nb-(12.0/50.9)\times V-(12.0/180.9)\times Ta)\times 10000 \quad (2)$$

where each of the element symbols C, Nb, V, and Ta indicates content by mass % of the corresponding element in the steel sheet, and the unit of C* is mass ppm.

8. The high-strength steel sheet according to claim 7, wherein the high-strength steel sheet is a cold-rolled steel sheet.

9. The high-strength steel sheet according to claim 7, wherein the high-strength steel sheet comprises a coating or plating on a surface thereof.

10. The high-strength steel sheet according to claim 7, wherein the microstructure contains martensite in an area ratio of 8% or more.

11. The high-strength steel sheet according to claim 7, wherein the microstructure contains tempered martensite in an area ratio of 14% or more and 60% or less.

12. The high-strength steel sheet according to claim 9, wherein the coating or plating is a galvanized coating or plating.

13. A method for producing the high-strength steel sheet according to claim 1, the method comprising:

heating a steel slab comprising a chemical composition to a temperature range of 1150° C. to 1300° C., wherein the chemical composition contains, by mass %, C: 0.060% or more and 0.200% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, Nb: 0.001% or more and 0.200% or less, V: 0.001% or more and 0.200% or less, and the balance being Fe and incidental impurities, the chemical composition satisfying a relation of 500≤C*≤1300, where C* is determined by formula (1) given below:

$$C^*=(C-(12.0/92.9)\times Nb-(12.0/50.9)\times V)\times 10000 \quad (1),$$

where each of the element symbols C, Nb, and V indicates content by mass % of the corresponding element in the steel sheet, and the unit of C* is mass ppm;

subjecting the steel slab to hot rolling with a finisher delivery temperature from 850° C. to 1000° C. to obtain a hot-rolled steel sheet;

subjecting the hot-rolled steel sheet to coiling in a temperature range of 500° C. to 800° C.;

subjecting the hot-rolled steel sheet that has been coiled to cold rolling at a cold rolling reduction of 40% or more to obtain a cold-rolled steel sheet;

subjecting the cold-rolled steel sheet to three successive heat treatments, wherein
a first heat treatment is performed by heating the cold-rolled steel sheet to a temperature range of 450° C. to 750° C. and retaining for 300 s or more in the temperature range of 450° C. to 750° C.,
a second heat treatment is performed by heating the cold-rolled steel sheet to an annealing temperature of 750° C. or higher and 950° C. or lower, and subsequently cooling to a cooling stop temperature of 50° C. or higher and 250° C. or lower with a mean cooling rate of 10° C./s or higher at least in a temperature range from the annealing temperature down to 500° C., and a third heat treatment is performed by heating the cold-rolled steel sheet is heated to a temperature range of above 250° C. to 600° C. and retained retaining for 10 s or more in the temperature range of above 250° C. to 600° C., thereby producing the high-strength steel sheet of claim 1.

14. The method according to claim 13, further comprising:

after the third heat treatment, subjecting the cold-rolled steel sheet to coating or plating treatment.

15. The method according to claim 13, wherein the mean cooling rate in the second heat treatment is 10° C./s or higher and 80° C./s or lower at least in a temperature range down to 500° C.

16. The method according to claim 14, wherein the coating or plating treatment is hot-dip galvanizing treatment.

17. The method according to claim 14, wherein the coating or plating treatment is hot-dip galvanizing treatment to form a hot-dip galvanized coating, and the method further comprises after the hot-dip galvanizing treatment, performing alloying treatment on the hot-dip galvanized coating in a temperature range of 470° C. to 600° C.

18. A method for producing the high-strength steel sheet according to claim 7, the method comprising:

heating a steel slab comprising a chemical composition to a temperature range of 1150° C. to 1300° C., wherein the chemical composition contains, by mass %, C: 0.060% or more and 0.200% or less, Si: 0.50% or more and 2.20% or less, Mn: 1.00% or more and 3.00% or less, P: 0.100% or less, S: 0.0100% or less, Al: 0.010% or more and 2.500% or less, N: 0.0100% or less, Nb: 0.001% or more and 0.200% or less, V: 0.001% or more and 0.200% or less, and at least one selected from groups (a) to (e):
(a) at least one selected from Cr: 0.05% or more and 1.00% or less, Mo: 0.05% or more and 1.00% or less, Ni: 0.05% or more and 1.00% or less, and Cu: 0.05% or more and 1.00% or less;
(b) B: 0.0003% or more and 0.0050% or less;
(c) at least one selected from Ca: 0.0010% or more and 0.0050% or less, Mg: 0.0005% or more and 0.0100% or less, and REM: 0.0003% or more and 0.0050% or less;
(d) at least one selected from Sn: 0.0020% or more and 0.2000% or less and Sb: 0.0020% or more and 0.2000% or less; and
(e) Ta: 0.0010% or more and 0.1000% or less; and the balance being Fe and incidental impurities, the chemical composition satisfying a relation of 500≤C*≤1300, where C* is determined by formula (1) or (2) given below:

in the case of the chemical composition not containing Ta, $$C^* = (C - (12.0/92.9) \times Nb - (12.0/50.9) \times V) \times 10000 \quad (1),$$

in the case of the chemical composition containing Ta, $$C^* = (C - (12.0/92.9) \times Nb - (12.0/50.9) \times V - (12.0/180.9) \times Ta) \times 10000 \quad (2)$$

where each of the element symbols C, Nb, V, and Ta indicates content by mass % of the corresponding element in the steel sheet, and the unit of C* is mass ppm;

subjecting the steel slab to hot rolling with a finisher delivery temperature from 850° C. to 1000° C. to obtain a hot-rolled steel sheet;

subjecting the hot-rolled steel sheet to coiling in a temperature range of 500° C. to 800° C.;

subjecting the hot-rolled steel sheet that has been coiled to cold rolling at a cold rolling reduction of 40% or more to obtain a cold-rolled steel sheet;

subjecting the cold-rolled steel sheet to three successive heat treatment, wherein a first heat treatment is performed by heating the cold-rolled steel sheet to a temperature range of 450° C. to 750° C. and retaining for 300 s or more in the temperature range of 450° C. to 750° C., a second heat treatment is performed by heating the cold-rolled steel sheet to an annealing temperature of 750° C. or higher and 950° C. or lower, and subsequently cooling to a cooling stop temperature of 50° C. or higher and 250° C. or lower with a mean cooling rate of 10° C./s or higher at least in a temperature range from the annealing temperature down to 500° C., and a third heat treatment is performed by heating the cold-rolled steel sheet to a temperature range of above 250° C. to 600° C. and retaining for 10 s or more in the temperature range of above 250° C. to 600° C., thereby producing the high-strength steel sheet of claim 7.

19. The method according to claim 18, further comprising:

after the third heat treatment, subjecting the cold-rolled steel sheet to coating or plating treatment.

20. The method according to claim 18, wherein the mean cooling rate in the second heat treatment is 10° C./s or higher and 80° C./s or lower at least in a temperature range down to 500° C.

21. The method according to claim 19, wherein the coating or plating treatment is hot-dip galvanizing treatment.

22. The method according to claim 19, wherein the coating or plating treatment is hot-dip galvanizing treatment to form a hot-dip galvanized coating, and the method further comprises after the hot-dip galvanizing treatment, performing alloying treatment on the hot-dip galvanized coating in a temperature range of 470° C. to 600° C.

\* \* \* \* \*